(12) United States Patent
Phanse et al.

(10) Patent No.: US 7,130,366 B2
(45) Date of Patent: Oct. 31, 2006

(54) COMPENSATION CIRCUIT AND METHOD FOR REDUCING INTERSYMBOL INTERFERENCE PRODUCTS CAUSED BY SIGNAL TRANSMISSION VIA DISPERSIVE MEDIA

(75) Inventors: Abhijit Phanse, Santa Clara, CA (US); Abhijit G. Shanbhag, San Jose, CA (US)

(73) Assignee: Scintera Networks, Inc., San Jose, CA (US)

( * ) Notice: Subject to any disclaimer, the term of this patent is extended or adjusted under 35 U.S.C. 154(b) by 308 days.

(21) Appl. No.: 10/290,674

(22) Filed: Nov. 8, 2002

(65) Prior Publication Data
US 2003/0189998 A1 Oct. 9, 2003

Related U.S. Application Data

(63) Continuation-in-part of application No. 10/117,293, filed on Apr. 5, 2002.

(51) Int. Cl.
*H04B 1/00* (2006.01)
(52) U.S. Cl. ............ 375/350; 375/229; 375/230; 375/231; 375/232; 375/233; 375/234
(58) Field of Classification Search ........ 375/229–236, 375/340, 341, 346, 348, 350; 714/795
See application file for complete search history.

(56) References Cited

U.S. PATENT DOCUMENTS

| | | | |
|---|---|---|---|
| 5,127,051 A | | 6/1992 | Chan et al. |
| 5,191,462 A | | 3/1993 | Gitlin et al. |
| 5,561,687 A | * | 10/1996 | Turner ................ 375/233 |
| 5,692,011 A | * | 11/1997 | Nobakht et al. ........ 375/233 |
| 5,748,674 A | * | 5/1998 | Lim ................... 375/233 |
| 6,009,120 A | * | 12/1999 | Nobakht ............... 375/229 |
| 6,012,161 A | | 1/2000 | Ariyavisitakul et al. |
| 6,088,389 A | | 7/2000 | Larsson |
| 6,185,250 B1 | | 2/2001 | Wang et al. |
| 6,226,323 B1 | | 5/2001 | Tan et al. |
| 6,240,133 B1 | | 5/2001 | Sommer et al. |
| 6,366,613 B1 | | 4/2002 | Sommer et al. |
| 6,438,164 B1 | | 8/2002 | Tan et al. |
| 6,563,812 B1 | * | 5/2003 | De ................... 370/342 |
| 6,668,014 B1 | * | 12/2003 | Endres et al. .......... 375/232 |

OTHER PUBLICATIONS

Merriam-Webster's Collegiate Dictionary (Tenth Edition, 2001) pp. 207 and 265.*
John G. Proakis, Digital Communications Fourth Edition, Chapter 10, 2001, McGraw-Hill Higher Education, New York, NY.
John G. Proakis, Digital Communications Fourth Edition, Chapter 11, 2001, McGraw-Hill Higher Education, New York, NY.

* cited by examiner

*Primary Examiner*—Khanh Tran
*Assistant Examiner*—Curtis Odom
(74) *Attorney, Agent, or Firm*—Vedder, Price, Kaufman & Kammholz P.C.

(57) ABSTRACT

A compensation circuit and method for reducing ISI products within an electrical data signal corresponding to a detected data signal received via a signal transmission medium introduces distinct compensation effects for individual ISI products within the electrical data signal. Distinct data signal components within the detected data signal and corresponding to such ISI products can be selectively and individually compensated, thereby producing a compensated data signal in which each selected one of such individual data signal components is substantially removed. Individual data signal components or selected combinations of data signal components can be compensated as desired.

120 Claims, 15 Drawing Sheets

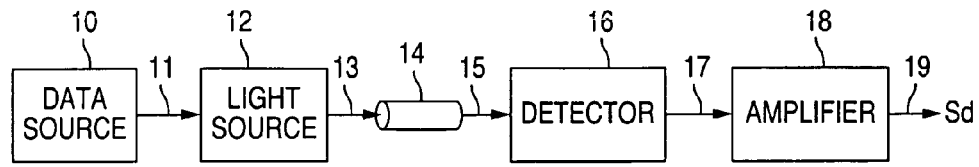
FIGURE 1
(PRIOR ART)
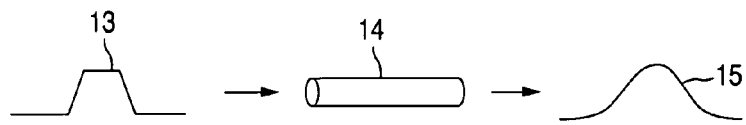
FIGURE 2
(PRIOR ART)
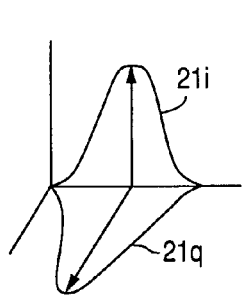 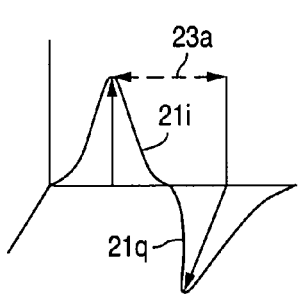 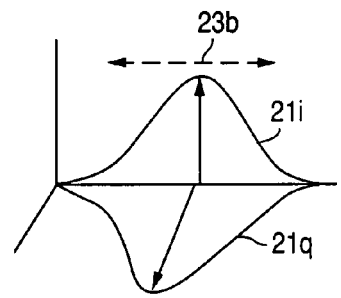
FIGURE 3A     FIGURE 3B     FIGURE 3C
(PRIOR ART)    (PRIOR ART)    (PRIOR ART)
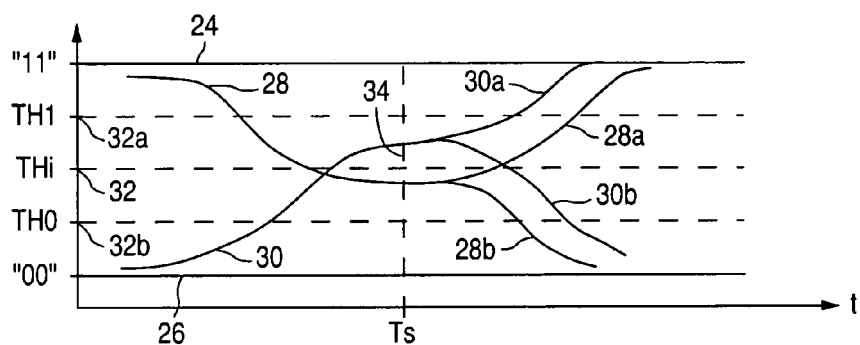
FIGURE 4
(PRIOR ART)

COMPENSATION CIRCUIT AND METHOD FOR REDUCING INTERSYMBOL INTERFERENCE PRODUCTS CAUSED BY SIGNAL TRANSMISSION VIA DISPERSIVE MEDIA

RELATED INVENTIONS

This application is a continuation-in-part of U.S. application Ser. No. 10/117,293, filed Apr. 5, 2002.

BACKGROUND OF THE INVENTION

1. Field of the Invention

The present invention relates to signal transmission and detection, and in particular, to techniques for compensating for signal distortions caused by signal dispersion and non-linearities within the signal transmission media.

2. Description of the Related Art

Referring to FIG. 1, a conventional fiber optic signal system includes a data source 10, a light source (e.g., a laser) 12, the fiber optic medium 14, a signal detector (e.g., photodetector) 16 and an amplifier (e.g., transimpedance) 18, interconnected substantially as shown. The data source 10 provides a stream, or sequence, of data symbols 11 which modulate the light source 12 which, in turn, launches an optical signal 13 into the optical fiber 14. (Typically each data symbol consists of a single data bit.) At the reception end of the fiber 14, the optical signal 15 is received and detected by the detector 16, with the resultant signal 17 being amplified by the amplifier 18 to produce the electrical data signal 19 representing the sequence of data symbols. This signal 19 is then processed by clock and data recovery ("CDR") circuitry (not shown) to recover the actual data and associated clock signals.

The detector 16 is typically some form of a direct detector, such as a photodetector. As is well known, the photodetector detects the modulated light forming the optical signal and, based on the amount of photonic energy in the optical signal, generates an electrical current signal corresponding to that photonic energy. Accordingly, the amplitude of the electrical current signal so generated varies in linear proportion to the received optical signal power since the amplitude of the current is proportional to the square of the optical signal amplitude.

It is well known that the bit rate of the data signal 11, as well as the length of the optical fiber 14, are limited in terms of how reliably a transmitted data can be received and accurately detected, due to the non-ideal characteristics of the fiber optic transmission medium 14. Referring to FIG. 2, for example, it is well known that an input data symbol 13, after propagating through the optical fiber 14, emerges as an optical signal 15 displaying a certain amount of signal dispersion. The amount of the signal dispersion increases in a manner corresponding to increases in the bit rate of the data signal 11 and length of the optical fiber 14.

One form of dispersion is chromatic dispersion which has a linear delay versus frequency characteristic. However, with direct optical signal detection, such as that done when using a photodetector, chromatic dispersion causes nonlinear distortions in the electrical signal of the receiver. Simple conventional linear equalization techniques are not adequate for compensating for such dispersion.

Referring to FIGS. 3A–3C, another form of dispersion is polar, or polar mode, dispersion. As shown in FIG. 3A, an optical signal transmitted through a single mode optical fiber actually transits light in two distinct polarization modes 21$i$, 21$q$. As is well known, the electrical fields of these two modes 21$i$, 21$q$ are orthogonal to each other. As the optical signal travels through the optical fiber 14, these two signal modes 21$i$, 21$q$ become misaligned, as shown in FIG. 3B. The amount of dispersion, or distance, 23$a$ between these two modes 21$i$, 21$q$ is dependent upon how asymmetrical certain characteristics of the optical fiber 14 are. For example, this dispersion 23 will increase in relation to the degree to which the refractive indices for each of the polarization modes 21$i$, 21$q$ differ from each other within the optical fiber 14.

Referring to FIG. 3C, such asymmetrical characteristics of the optical fiber 14 tend to vary randomly along the fiber 14. Additionally, the optical signal can sometimes shift randomly between the polarization modes, thereby causing the phase shift between the two polarization modes to not accumulate consistently along the length of the optical fiber 14. Accordingly, the pulse duration 23$b$ becomes stretched in time.

With polarization dispersion occurring in addition to chromatic dispersion, simple linear equalization techniques become even less effective as well as less practical due to the increasing complexity of the equalization circuitry necessary for compensation.

Referring to FIG. 4, the effect that such signal dispersion characteristics have upon the detected data signal can be better understood. As discussed above, the data signal consists of data symbols in the form of individual data bits. For this binary form of signal it is assumed that a binary value of unity (1) appears as a "high" signal value and a binary value of zero (0) appears as a "low" signal value at the output 17 of the detector 16 (or output 19 of the amplifier 18). However, consistent with the foregoing discussion, the dispersion effects of the optical fiber 14 are such that the value of the detected signal fails to achieve these ideal signal values due to the intersymbol interference ("ISI") caused by the dispersion effects upon adjacent data bits as well as the present or desired data bit.

For example, let it be assumed that two adjacent data bits each have binary values of unity. Accordingly, this will produce the maximum signal value 24. Conversely, two adjacent data bits having binary values of 0 will produce the minimum signal value 26. Data bit pairs of "01" or "10" will produce signal values which are somewhere between these maximum 24 and minimum 26 values.

For example, following a bit value of unity, the signal value 28 will decrease and then either increase as value 28$a$ or continue to decrease as value 28$b$ when the value of the immediately subsequent data bit is unity or zero, respectively. Similarly, following a data bit value of zero, the signal value 30 will increase and then either continue to increase as value 30$a$ or decrease as value 30$b$ when the subsequent data bit has a value of unity or 0, respectively.

For purposes of this example, it is further assumed that the second bit of this bit pair is the transmitted bit intended for detection during the signal detection interval, centered about time Ts. By observing the signal at this time Ts, and comparing it to a threshold TH, a decision is made as to whether the signal level indicates a bit value of either unity or 0. However, as seen in FIG. 4, due to the dispersion effects and resulting ISI, there is a gap 34, referred to as the signal "eye", between the possible signal values. As a result, incorrect decisions may be made as to the unity or zero value of the detected signal at time Ts.

Frequently, a fixed threshold value 32 is used for making this decision. The problem with this conventional approach, is that if the distortion affects cause the opening of the signal eye to not be centered about this threshold value 32 then the signal value will be incorrectly detected.

One conventional technique for compensating for this problem is to increase the effective size of the signal eye, thereby increasing the potential distance between detected signals representing values of unity and 0. Such technique uses a feedback signal to modify, e.g., increase or decrease as appropriate, the electrical signal 17/19 (FIG. 1) by shifting the signal wave for maximum 24 and minimum 26 levels up or down so that the effective threshold values 32a, 32b appear halfway between them. However, while this may be effective at low data rates, it becomes significantly less effective at high data rates.

Another conventional technique has been to modify the threshold, rather than modify the detected signal. With reference to FIG. 4, this would be done by shifting the threshold 32 in accordance with what the immediately preceding adjacent data bit value was. For example, if the immediately preceding adjacent data bit had a value of unity or zero, the effective threshold would be shifted to a higher 32a or lower 32b value, respectively.

While these techniques can be somewhat effective, such techniques do nothing to remove distortion from the data signal. Instead, such techniques merely use information about the distortion in an attempt to achieve an approximately equivalent, but inferior, effect.

Accordingly, it would be desirable to have a compensation technique for reducing ISI products by more directly compensating for the individual ISI products.

SUMMARY OF THE INVENTION

In accordance with the presently claimed invention, a compensation circuit and method for reducing ISI products within an electrical data signal corresponding to a detected data signal received via a signal transmission medium introduces distinct compensation effects for individual ISI products within the electrical data signal. Distinct data signal components within the detected data signal and corresponding to such ISI products can be selectively and individually compensated, thereby producing a compensated data signal in which each selected one of such individual data signal components is substantially removed. Individual data signal components or selected combinations of data signal components can be compensated as desired.

In accordance with one embodiment of the presently claimed invention, a compensation circuit for reducing intersymbol interference (ISI) products within a data signal includes input and output terminals, adaptive equalization circuitry, equalization and processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The equalization and processing circuitry, coupled to the input terminal, selectively equalizes and processes the input data signal to provide a processed signal. The output processing circuitry, coupled to the adaptive equalization circuitry, the equalization and processing circuitry, and the output terminal, receives the processed signal and in response thereto receives and processes the equalized signal to provide the output data signal.

In accordance with another embodiment of the presently claimed invention, a compensation circuit for reducing intersymbol interference (ISI) products within a data signal includes input and output terminals, adaptive equalization circuitry, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The equalization and processing circuitry, coupled to the input terminal, selectively equalizes and processes the input data signal to provide a first processed signal. The signal combining circuitry, coupled to the adaptive equalization circuitry, receives and selectively combines a second processed signal and the equalized signal to provide a resultant signal. The output processing circuitry, coupled to the equalization and processing circuitry, the signal combining circuitry and the output terminal, receives the first processed signal and in response thereto receives and processes the resultant signal to provide the output data signal and the second processed signal.

In accordance with another embodiment of the presently claimed invention, a compensation circuit for reducing intersymbol interference (ISI) products within a data signal includes input and output terminals, adaptive equalization circuitry, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. The equalization and processing circuitry, coupled between the input and output terminals, selectively equalizes and processes the input data signal and at least a portion of the output data signal to provide first and second processed signals. The signal combining circuitry, coupled to the adaptive equalization circuitry and the equalization and processing circuitry, receives and selectively combines the second processed signal and the equalized signal to provide a resultant signal. The output processing circuitry, coupled to the equalization and processing circuitry, the signal combining circuitry and the output terminal, receives the first processed signal and in response thereto receives and processes the resultant signal to provide the output data signal.

In accordance with another embodiment of the presently claimed invention, a compensation circuit for reducing intersymbol interference (ISI) products within a data signal includes input and output terminals, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The equalization and processing circuitry, coupled to the input terminal, selectively equalizes and processes the input data signal to provide a first processed signal. The signal combining circuitry, coupled to the input terminal, receives and selectively combines a second processed signal and the input data signal to provide a resultant signal. The output processing circuitry, coupled to the equalization and processing circuitry, the signal combining circuitry and the output terminal, receives the first processed signal and in response thereto receives and processes the resultant signal to provide the output data signal and the second processed signal.

In accordance with another embodiment of the presently claimed invention, a compensation circuit for reducing intersymbol interference (ISI) products within a data signal includes input and output terminals, equalization and processing circuitry, signal combining circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The equalization and processing circuitry, coupled between the input and output terminals, selectively equalizes and processes the input data signal and at least a portion of the output data signal to provide first and second processed signals. The signal combining circuitry, coupled to the input terminal and the equalization and processing circuitry, receives and selectively combines the second processed signal and the input data signal to provide a resultant signal. The output processing circuitry, coupled to equalization and processing circuitry, the signal combining circuitry and the output terminal, receives the first processed signal and in response thereto receives and processes the resultant signal to provide the output data signal.

In accordance with another embodiment of the presently claimed invention, a compensation method for reducing intersymbol interference (ISI) products within a data signal includes:

receiving an input data signal including a first plurality of ISI products and corresponding to a detected data signal received via a signal transmission medium;

adaptively equalizing the input data signal and providing a first equalized signal;

selectively equalizing and processing the input data signal and providing a processed signal; and processing the first equalized signal in response to the processed signal and providing an output data signal including a second plurality of ISI products which is smaller than the first plurality of ISI products.

In accordance with another embodiment of the presently claimed invention, a compensation method for reducing intersymbol interference (ISI) products within a data signal includes:

receiving an input data signal including a first plurality of ISI products and corresponding to a detected data signal received via a signal transmission medium;

adaptively equalizing the input data signal and providing a first equalized signal;

selectively equalizing and processing the input data signal and providing a first processed signal;

selectively combining a second processed signal and the first equalized signal and providing a resultant signal; and processing the resultant signal in response to the first processed signal and providing the second processed signal and an output data signal including a second plurality of ISI products which is smaller than the first plurality of ISI products.

In accordance with another embodiment of the presently claimed invention, a compensation method for reducing intersymbol interference (ISI) products within a data signal includes:

receiving an input data signal including a first plurality of ISI products and corresponding to a detected data signal received via a signal transmission medium;

adaptively equalizing the input data signal and providing a first equalized signal;

selectively equalizing and processing the input data signal and at least a portion of the output data signal and providing first and second processed signals;

selectively combining the second processed signal and the first equalized signal and providing a resultant signal; and processing the resultant signal in response to the first processed signal and providing an output data signal including a second plurality of ISI products which is smaller than the first plurality of ISI products.

In accordance with another embodiment of the presently claimed invention, a compensation method for reducing intersymbol interference (ISI) products within a data signal includes:

receiving an input data signal including a first plurality of ISI products and corresponding to a detected data signal received via a signal transmission medium;

selectively equalizing and processing the input data signal and providing a first processed signal;

selectively combining a second processed signal and the input data signal and providing a resultant signal; and processing the resultant signal in response to the first processed signal and providing the second processed signal and an output data signal including a second plurality of ISI products which is smaller than the first plurality of ISI products.

In accordance with another embodiment of the presently claimed invention, a compensation method for reducing intersymbol interference (ISI) products within a data signal includes:

receiving an input data signal including a first plurality of ISI products and corresponding to a detected data signal received via a signal transmission medium;

selectively equalizing and processing the input data signal and at least a portion of the output data signal and providing first and second processed signals;

selectively combining the second processed signal and the input data signal and providing a resultant signal; and processing the resultant signal in response to the first processed signal and providing an output data signal including a second plurality of ISI products which is smaller than the first plurality of ISI products.

In accordance with another embodiment of the presently claimed invention, a compensation circuit for reducing intersymbol interference (ISI) products within a data signal includes input and output terminals, adaptive equalization circuitry, signal combining circuitry, signal slicing circuitry, intermediate processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. First signal combining circuitry, coupled to the adaptive equalization circuitry, receives and selectively combines a feedback signal and the equalized signal to provide an intermediate signal. Signal slicing circuitry, coupled to the first signal combining circuitry, slices the intermediate signal to provide a sliced signal. First intermediate processing circuitry, coupled to the signal slicing circuitry and the first signal combining circuitry, processes at least one of the sliced signal and at least a portion of the output data signal to provide the feedback signal. Second intermediate processing circuitry, coupled between the signal slicing circuitry and the output terminal, processes the sliced signal and another portion of the output data signal to provide a first processed signal. Second signal combining circuitry, coupled to the input terminal and the second intermediate processing circuitry, receives and selectively combines the first processed signal, a second processed signal and the input data signal to provide a resultant signal. The output processing circuitry, coupled between the second signal combining circuitry and the output terminal, processes the resultant signal to provide the output data signal and the second processed signal.

In accordance with another embodiment of the presently claimed invention, a compensation circuit for reducing intersymbol interference (ISI) products within a data signal includes input and output terminals, adaptive equalization circuitry, signal combining circuitry, signal slicing circuitry, first intermediate processing circuitry, second intermediate processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide an equalized signal. First signal combining circuitry, coupled to the adaptive equalization circuitry, receives and selectively combines a feedback signal and the equalized signal to provide an intermediate signal. The signal slicing circuitry, coupled to the first signal combining circuitry, slices the intermediate signal to provide a sliced signal. First intermediate processing circuitry, coupled to the signal slicing circuitry and the first signal combining circuitry, processes at least one of the first sliced signal and at least a portion of the output data signal to provide the feedback signal. Second intermediate processing circuitry, coupled between the signal slicing circuitry and the output terminal, processes the first sliced signal and another portion of the output data signal to provide a processed signal. Second signal combining circuitry, coupled to the input terminal and the adaptive equalization circuitry, receives and selectively combines the processed signal and the input data signal to provide a resultant signal. The output processing circuitry, coupled between the second signal combining circuitry and the output terminal, processes the resultant signal to provide the output data signal.

In accordance with another embodiment of the presently claimed invention, a compensation circuit for reducing intersymbol interference (ISI) products within a data signal includes input and output terminals, adaptive equalization circuitry, signal combining circuitry, signal slicing circuitry, intermediate processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. First adaptive equalization circuitry, coupled to the input terminal, adaptively equalizes the input data signal to provide a first equalized signal. Second adaptive equalization circuitry, coupled to the input terminal, adaptively equalizes the input data signal to provide a second equalized signal. First signal combining circuitry, coupled to the second adaptive equalization circuitry, receives and selectively combines a feedback signal and the second equalized signal to provide an intermediate signal. The signal slicing circuitry, coupled to the first signal combining circuitry, slices the intermediate signal to provide a first sliced signal. First intermediate processing circuitry, coupled to the first signal slicing circuitry and the first signal combining circuitry, processes at least one of the first sliced signal and at least a portion of the output data signal to provide the feedback signal. Second intermediate processing circuitry, coupled between the signal slicing circuitry and the output terminal, processes the first sliced signal and another portion of the output data signal to provide a first processed signal. Second signal combining circuitry, coupled to the first adaptive equalization circuitry and the second adaptive equalization circuitry, receives and selectively combines the first processed signal, a second processed signal and the first equalized signal to provide a resultant signal. The output processing circuitry, coupled between the second signal combining circuitry and the output terminal, processes the resultant signal to provide the output data signal and the second processed signal.

In accordance with another embodiment of the presently claimed invention, a method for reducing intersymbol interference (ISI) products within a data signal includes:

receiving an input data signal that includes a first plurality of ISI products and corresponds to a detected data signal received via a signal transmission medium;

adaptively equalizing the input data signal and providing an equalized signal;

selectively combining a feedback signal and the equalized signal and providing an intermediate signal;

slicing the intermediate signal and providing a first sliced signal;

processing at least one of the first sliced signal and at least a portion of the output data signal and providing the feedback signal;

processing the first sliced signal and another portion of the output data signal and providing a first processed signal;

selectively combining the first processed signal, a second processed signal and the input data signal and providing a resultant signal; and processing the resultant signal and providing the second processed signal and an output data signal that includes a second plurality of ISI products which is smaller than the first plurality of ISI products.

In accordance with another embodiment of the presently claimed invention, a method for reducing intersymbol interference (ISI) products within a data signal includes:

receiving an input data signal that includes a first plurality of ISI products and corresponds to a detected data signal received via a signal transmission medium;

adaptively equalizing the input data signal and providing an equalized signal;

selectively combining a feedback signal and the equalized signal and providing an intermediate signal;

slicing the intermediate signal and providing a first sliced signal;

processing at least one of the first sliced signal and at least a portion of the output data signal and providing the feedback signal;

processing the first sliced signal and another portion of the output data signal and providing a processed signal;

selectively combining the processed signal and the input data signal and providing a resultant signal; and processing the resultant signal and providing an output data signal that includes a second plurality of ISI products which is smaller than the first plurality of ISI products.

In accordance with another embodiment of the presently claimed invention, a method for reducing intersymbol interference (ISI) products within a data signal includes:

receiving an input data signal that includes a first plurality of ISI products and corresponds to a detected data signal received via a signal transmission medium;

adaptively equalizing the input data signal and providing a first equalized signal;

adaptively equalizing the input data signal and providing a second equalized signal;

selectively combining a feedback signal and the second equalized signal and providing an intermediate signal;

slicing the intermediate signal and providing a first sliced signal;

processing at least one of the first sliced signal and at least a portion of the output data signal and providing the feedback signal;

processing the first sliced signal and another portion of the output data signal and providing a first processed signal;

selectively combining the first processed signal, a second processed signal and the first equalized signal and providing a resultant signal; and processing the resultant signal and providing the second processed signal and an output data signal that includes a second plurality of ISI products which is smaller than the first plurality of ISI products.

In accordance with another embodiment of the presently claimed invention, a compensation circuit for reducing intersymbol interference (ISI) products within a data signal includes input and output terminals, adaptive equalization circuitry, signal combining circuitry, signal slicing circuitry, intermediate processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. First adaptive equalization circuitry, coupled to the input terminal, adaptively equalizes the input data signal to provide a first equalized signal. Second adaptive equalization circuitry, coupled to the input terminal, adaptively equalizes the input data signal to provide a second equalized signal. First signal combining circuitry, coupled to the second adaptive equalization circuitry, receives and selectively combines a feedback signal and the second equalized signal to provide an intermediate signal. The signal slicing circuitry, coupled to the first signal combining circuitry, slices the intermediate signal to provide a first sliced signal. First intermediate processing circuitry, coupled to the first signal slicing circuitry and the first signal combining circuitry, processes at least one of the first sliced signal and at least a portion of the output data signal to provide the feedback signal. Second intermediate processing circuitry, coupled between the first signal slicing circuitry and the output terminal, processes the first sliced signal and another portion of the output data signal to provide a processed signal. Second signal combining circuitry, coupled to the first adaptive equalization circuitry and the second adaptive equalization circuitry, that receives and selectively combines the processed signal and the first equalized signal to provide a resultant signal. The output processing circuitry, coupled between the second signal combining circuitry and the output terminal, that processes the resultant signal to provide the output data signal.

In accordance with another embodiment of the presently claimed invention, a method for reducing intersymbol interference (ISI) products within a data signal includes:

receiving an input data signal that includes a first plurality of ISI products and corresponds to a detected data signal received via a signal transmission medium;

adaptively equalizing the input data signal and providing a first equalized signal;

adaptively equalizing the input data signal and providing a second equalized signal;

selectively combining a feedback signal and the second equalized signal and providing an intermediate signal;

slicing the intermediate signal and providing a first sliced signal;

processing at least one of the first sliced signal and at least a portion of the output data signal and providing the feedback signal;

processing the first sliced signal and another portion of the output data signal and providing a processed signal;

selectively combining the processed signal and the first equalized signal and providing a resultant signal; and processing the resultant signal and providing an output data signal that includes a second plurality of ISI products which is smaller than the first plurality of ISI products.

In accordance with another embodiment of the presently claimed invention, a compensation circuit for reducing intersymbol interference (ISI) products within a data signal includes input and output terminals, adaptive equalization circuitry, signal slicing circuitry, intermediate processing circuitry and output processing circuitry. The input terminal conveys an input data signal including a first plurality of ISI products and corresponding to a detected data signal received via a signal transmission medium. The output terminal conveys an output data signal including a second plurality of ISI products which is smaller than the first plurality of ISI products. The adaptive equalization circuitry, coupled to the input terminal, adaptively equalizes the input data signal to provide first and second equalized signals. The signal slicing circuitry, coupled to the adaptive equalization circuitry, selectively slices the first equalized signal to provide a sliced signal. The intermediate processing circuitry, coupled to the signal slicing circuitry, processes the sliced signal to provide at least one processed signal. The output processing circuitry, coupled between the adaptive equalization circuitry, the intermediate processing circuitry and the output terminal, selectively processes the second equalized signal and the at least one processed signal to provide the output data signal.

In accordance with another embodiment of the presently claimed invention, a method for reducing intersymbol interference (ISI) products within a data signal includes:

receiving an input data signal including a first plurality of ISI products and corresponding to a detected data signal received via a signal transmission medium;

adaptively equalizing the input data signal and providing first and second equalized signals;

selectively slicing the first equalized signal and providing a sliced signal;

processing the sliced signal and providing at least one processed signal; and selectively processing the second equalized signal and the at least one processed signal and providing an output data signal including a second plurality of ISI products which is smaller than the first plurality of ISI products.

BRIEF DESCRIPTION OF THE DRAWINGS

FIG. 1 is a functional block diagram of a conventional fiber optic signal system.

FIG. 2 illustrates how the dispersion effects of an optical fiber produce distortion within the optical data signal.

FIGS. 3A–3C illustrate effects of polarization mode dispersion within an optical fiber.

FIG. 4 illustrates relationships between detected signal values and signal detection thresholds.

DETAILED DESCRIPTION OF THE INVENTION

Figure 5A:
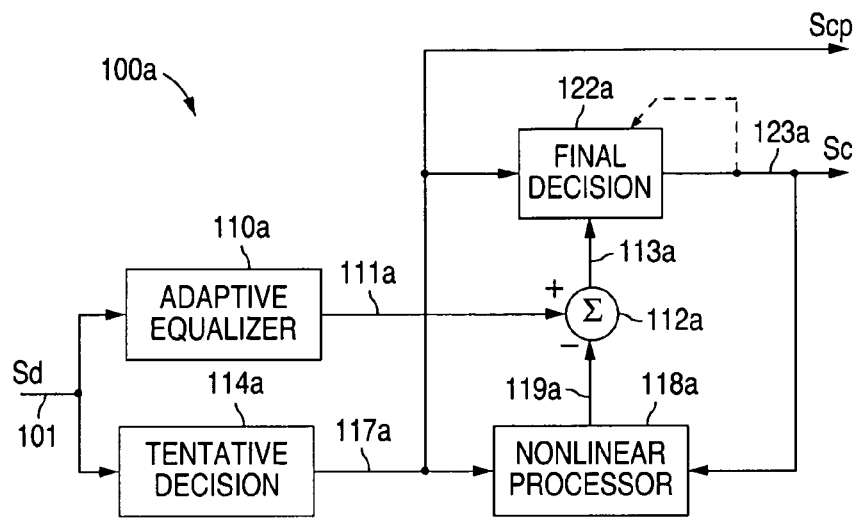
FIGS. 5A–5F are functional block diagrams of compensation circuits in accordance with example embodiments of the presently claimed invention.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are coupled together to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

The subject matter discussed herein, including the presently claimed invention, is compatible and suitable for use with the subject matter disclosed in the following copending, commonly assigned patent applications: U.S. patent application Ser. No. 10/117,293, filed Apr. 5, 2002, and entitled "Compensation Circuit For Reducing Intersymbol Interference Products Caused By Signal Transmission Via Dispersive Media"; U.S. patent application Ser. No. 10/179,689, filed Jun. 24, 2002, and entitled "Crosstalk Compensation Engine For Reducing Signal Crosstalk Effects Within A Data Signal"; U.S. patent application Ser. No. 10/244,500, filed Sep. 16, 2002, and entitled "Compensation Method For Reducing Intersymbol Interference Products Caused By Signal Transmission Via Dispersive Media"; U.S. patent application Ser. No. 11/284,391, filed on even date herewith, and entitled "Adaptive Coefficient Signal Generator For Adaptive Signal Equalizers With Fractionally-Spaced Feedback"; and U.S. patent application Ser. No 10/290,993, filed on even date herewith, and entitled "Adaptive Signal Equalizer With Adaptive Error Timing And Precursor/Postcursor Configuration Control".

As an introduction to a more detailed discussion of an actual implementation of the presently claimed invention, a discussion is presented on the use of signal processing techniques for optical channels, fundamental performance limits and specific algorithms optimized for the optical channel with constrained architectures and/or other requirements. It begins with a simplified representation of the optical channel with respect to signal dispersion, which is sufficient to develop an optimized algorithm design. Discussed then are performance penalties incurred in the absence of appropriate signal processing techniques, followed by different classes of signal processing algorithm structures and corresponding optimized algorithms in the presence, as well as the absence, of symbol timing information. Different adaptation algorithm considerations are then noted. Initially, fiber and component nonlinearities are disregarded, following which, effects and mitigation of different fiber nonlinearities and cross-talk effects are considered.

It is assumed that the data signal modulation format is the simple but prevalent binary non-return to zero ("NRZ"), on-off keying ("OOK") with direct detection (e.g., as opposed to multi-level modulation, coherent detection or sub-carrier modulated systems). Thus, the transmit signal may be expressed as follows:

$$x(t) = \text{Re}\left\{\sum_i a_i h_T(t+iT) \cdot e^{j(\omega_c t + \phi_c(t))}\right\}$$
$$= \text{Re}\{\hat{x}(t)\}$$

where $h_T(t)$ represents the transmit pulse-shaping filter, $\{a_i\}$ represents the sequence of data symbols, $\phi(t)=\omega_c t+\phi_c(t)$ represents the phase angle, $\omega_c$ represents the carrier frequency, $$\frac{d\phi_c(t)}{dt}$$

represents the chirp (typically with direct modulators), and $\hat{x}(t)$ is the corresponding complex signal.

Assuming only first-order polarization mode dispersion ("PMD") and ignoring nonlinearity effects, the signal at the input of the photodetector for the two orthogonal PMD signal modes can be expressed as follows:

$$s_{o,1}(t)=Re\{\hat{x}(t)*(h_c(t)e^{j\omega_c t})\}+n_1(t)=Re\{S_{o,1}(t)\}+n_1(t)$$

$$s_{o,2}(t)=Re\{\hat{x}(t+\tau)*(h_c(t)e^{j\omega_c t})\}+n_2(t)=Re\{S_{o,2}(t)\}+n_2(t)$$

where $h_c(t) \rightarrow H_c(f)=e^{-j\alpha f^2}$, $$\alpha = \pi D(\lambda) L \frac{\lambda^2}{c}$$

and $S_{o,1}(t)$, $S_{o,2}(t)$ are the corresponding complex analytic signals, $n_1(t)$, $n_2(t)$, are the Amplifier Spontaneous Emission (ASE) noise, and $D(\lambda)$, L are the linear delay coefficient and fiber length, respectively. (For purposes of simplifying the analysis, the extinction ratio has been disregarded.)

The output of the photodetector (with first-order PMD effects only) is as follows:

$$S_e(t)=a_1(|S_{o,1}(t)+n_1(t)|^2+a|S_{o,2}(t)+n_2(t)|^2)+n(t)$$

with n(t) assumed Gaussian with variance $N_0/2$ and accounts for thermal and shot noise.

This can be expanded to the following:

$$s_e(t) = \alpha_1 \left[ \sum_{i,k} a_i a_k (h_T(t+iT)e^{j\phi_c(t)} * h_c(t)) \cdot (h_T(t+kT)e^{-j\phi_c(t)} * h_c^*(t)) + \right.$$

$$\alpha \sum_{i,k} a_i a_k (h_T(t+\tau+iT)e^{j\phi_c(t+\tau)} * h_c(t)) \cdot$$

$$(h_T(t+\tau+kT)e^{-j\phi_c(t+\tau)} * h_c^*(t)) +$$

$$2\alpha_1 Re[S_{o,1}(t)n_1^*(t) + \alpha S_{o,2}(t)n_2^*(t)] + |n_1(t)|^2 + |n_2(t)|^2 + n(t)$$

For now, we will denote $$N(t)=2a_1 Re[S_{o,1}(t)n_1^*(t)+aS_{o,2}(t)n_2^*(t)]+|n_1(t)|^2+|n_2(t)|^2+n(t)$$

which is colored noise. Generally, we will ignore the terms $|n_1(t)|^2$, $|n_2(t)|^2$ in which case N(t) is Gaussian. This noise may also be non-stationary if the signal waveforms are considered to be a random (as opposed to deterministic) process.

Assuming $\phi_c(i)$ remains relatively constant during a dispersed symbol time interval, this may be further simplified to:

$$s_e(t) = \qquad \text{(EQ. 1)}$$

$$\alpha_1 \sum_{i,j} a_i a_j [p(t+iT)p^*(t+jT) + \alpha p(t+\tau+iT)p^*(t+\tau+jT)] +$$

$$N(t)$$

or equivalently, $$s_e(t) = \alpha_1 \sum_{i,j} a_i a_j [p_{i,j}(t) + \alpha p_{i,j}(t+\tau)] + N(t)$$

$$= s_{e,sig}(t) + N(t)$$

where $p(t)=h_T(t)*h_c(t)$ (the data symbol pulse p(t) is the convolution ("*") of the transmit pulse-shaping filter transfer function $h_T(t)$ and the chromatic dispersion $h_c(t)$) and $$p_{i,j}(t)=p(t+iT)p^*(t+jT).$$

Equation EQ. 1 is the key manifestation of dispersion (simplified form), which needs to be equalized or mitigated. There are two special cases of the more general scenario set forth above, which may simplify the analysis. The first case is where $p_{i,j}(t)=0$, $i \neq j$; generally equivalent to no chromatic dispersion, and the pulse broadening is due to PMD and laser chirp, in which case equation EQ. 1 as set forth above may be simplified to the following:

$$s_e(t) = \alpha_1 \sum_i a_i (p^2(t+iT) + \alpha p^2(t+\tau+iT)) + N(t)$$

The second case is where there is no PMD, in which case equation EQ. 1 can be simplified to:

$$s_e(t) = \alpha_1 \sum_{i,j} a_i a_j p(t+iT)p^*(t+jT) + N(t)$$

Different measures can be taken to estimate the loss due to dispersion and may range from a simple computation based upon a coarse estimate to a more difficult computation based upon a more elaborate estimate. These measures can be considered in more detail as follows.

Delay spread: This is a coarse but readily computable quantity. The pulse broadening at distance z can be expressed as follows:

$$T_z = T_0 \sqrt{(1+\kappa\beta_2 z/T_0^2)^2 + (1+W_0^2 T_0^2)(\beta_2 z/T_0^2)^2} + \tau$$

Root mean square ("RMS") and peak distortion criteria and bit error rate ("BER") computation: The peak distortion criterion provides the worst case ISI distortion, which may generally occur with a very low probability. If a classical receiver uses a simple low-pass filter (typically matched to the transmit pulse shape) with impulse response $h_R(t)$, the signal at the output of this filter can be expressed as follows:

$$r_e(t) = \alpha_1 \sum_{i,j} a_i a_j [q_{i,j}(t) + \alpha q_{i,j}(t+\tau)] + n(t),$$

where $q_{i,j}(t)=P_{i,j}(t)*h_R(t)$.

The peak distortion criterion may then be expressed as follows:

$$D_p = \alpha_1 E_a \max_{\tau \in [0,T]} \sum_{(t,j) \neq (0,0)} |q_{t,j}(t) + \alpha q_{i,j}(t+\tau)|$$

and for a symbol interval:

$$D_p(t) = \alpha_1 E_a \sum_{(t,j) \neq (0,0)} |q_{i,j}(t) + \alpha q_{i,j}(t+\tau)|; \quad 0 \leq t \leq T.$$

The RMS distortion criterion may also be simply computed. With the RMS distortion criteria, the BER may be computed assuming the ISI to be Gaussian distributed.

BER computation with saddle-point approximation: This is a more accurate measure of the BER in the presence of ISI without assuming the ISI to be Gaussian distributed.

Different performance bounds can be considered for purposes of determining performance limits of electronic signal processing. The two more common upper bounds of performance include the matched filter bound and the maximum likelihood sequence detection bound. When $N(t) \approx n(t)$, i.e., when ASE noise is negligible as is possible with metro systems, the matched filter bound (MFB) can be expressed as follows:

$$SNR_{MFB} = \frac{\alpha_1^2 E_d \|p^2(t) + \alpha p^2(t+\tau)\|^2}{N_0/2}$$

where $E_d$ is the energy per data symbol.

The upper bound of the probability of bit errors can then be expressed as follows:

$$P_e \leq Q\left(\sqrt{\frac{SNR_{MFB}}{4}}\right)$$

When considering ASE noise as the dominant, noise but ignoring the higher order powers of the ASE noise, the noise N(t) is colored and Gaussian. The MFB in this case may be expressed as:

$$SNR_{MFB} = \frac{\alpha_1^2 E_d \int_{t=0}^{T} (p^2(t) + \alpha p^2(t+\tau)) dt}{2 N_0'}$$

It may be noted that, interestingly, an optimal matched filter can be a simple "integrate and dump" type of filter.

Referring to FIG. 5A, a compensation circuit 100a for reducing intersymbol interference products within an electrical data signal corresponding to a detected optical data signal received via an optical fiber in accordance with one embodiment of the presently claimed invention includes, in various combinations as will be discussed below: an adaptive equalizer 110a; a signal combiner 112a; "tentative decision" circuitry (e.g., another adaptive equalizer) 114a; a nonlinear signal processor 118a; and "final decision" circuitry (e.g., a signal slicer) 122a; all interconnected substantially as shown. This circuit 100a provides nonlinear decision feedback equalization (NL-DFE) as follows.

The tentative decision circuitry 114a carries out "tentative" decisions 117a for the future symbols and possibly the current symbol. The nonlinear processor 118a forms a weighted sum 119a of products of two final decisions (possibly identical, necessarily past symbols), one final and one tentative decision (one past symbol and one future symbol or one past symbol and one current symbol), and/or two tentative decisions (possibly identical, both future symbols, or one future and one current symbol). Note that the product of identical symbols is the same symbol, since $a_1^2 = a_1$. The output signal 119a from the nonlinear processor 118a is then cancelled from the output signal 111a of the adaptive equalizer 110a which in general is an adaptive, fractionally-spaced equalizer. The final decision circuitry 122a may be a simple slicer or an adaptive slicer with an adaptive threshold or gain to account for terms that are products of current symbols with either only past symbols (final decisions 123a) or both past and future symbols (tentative decisions 117a).

This circuitry structure will be referred to as the "General NL-DFE." Based upon selections of the Tentative Decision Block 114a (typically, a linear equalizer with slicer or linear DFE), the Final Decision block 122a (simple slicer or adaptive slicer) and the product choices within the nonlinear processor 118a, different realizations of the General NL-DFE are possible.

One realization of the nonlinear DFE filter is treated in more depth below. This structure will be referred to as Example NL-DFE. In this, the Tentative Decision Block 114a is a linear, fractionally-spaced equalizer with slicer. The Final Decision block 122a is an adaptive slicer (can also be a simple slicer). The nonlinear processor 118a forms a weighted sum 119a of products of two past symbols (final decisions) and one past and one future symbol. For convenience, the nonlinear processor 118a is split for clarity, with the first nonlinear processor 118b forming a weighted sum 119b of one past 123b and one future 117b symbol, and the other nonlinear processor 120b forming a weighted sum 121b of products of past symbols 123b.

In accordance with one embodiment of the presently claimed invention, e.g., an example of the NL-DFE discussed above, nonlinear equalization in the form of decision feedback equalization (DFE) is used, and is applied based upon a rewritten form of equation EQ. 1. as follows (where $a_0$ is the data symbol sought to be detected, e.g., the present data symbol):

$$s_{e,stg}(t) = \alpha_1 a_0 [p_{0,0}(t) + \alpha p_{0,0}(t+\tau)] + \quad (T1)$$

$$\alpha_1 \sum_{i \geq 0, j > 0} a_i a_j [p_{i,j}(t) + \alpha p_{i,j}(t+\tau)] + \quad (T2)$$

$$\alpha_1 a_0 \sum_{j < 0} a_j [p_{0,j}(t) + \alpha p_{0,j}(t+\tau)] + \quad (T3)$$

$$\alpha_1 \sum_{i < 0, j < 0} a_i a_j [p_{i,j}(t) + \alpha p_{i,j}(t+\tau)] + \quad (T4)$$

$$2\alpha_1 \sum_{i > 0, j < 0} a_i a_j [p_{i,j}(t) + \alpha p_{i,j}(t+\tau)] \quad (T5)$$

Note that while the non-white, or colored, characteristic of the additive noise N(t) is not considered explicitly, it may be assumed that the application of a linear filter whitens the noise and is subsumed within $S_{e,sig}(t)$.

Figure 5B:
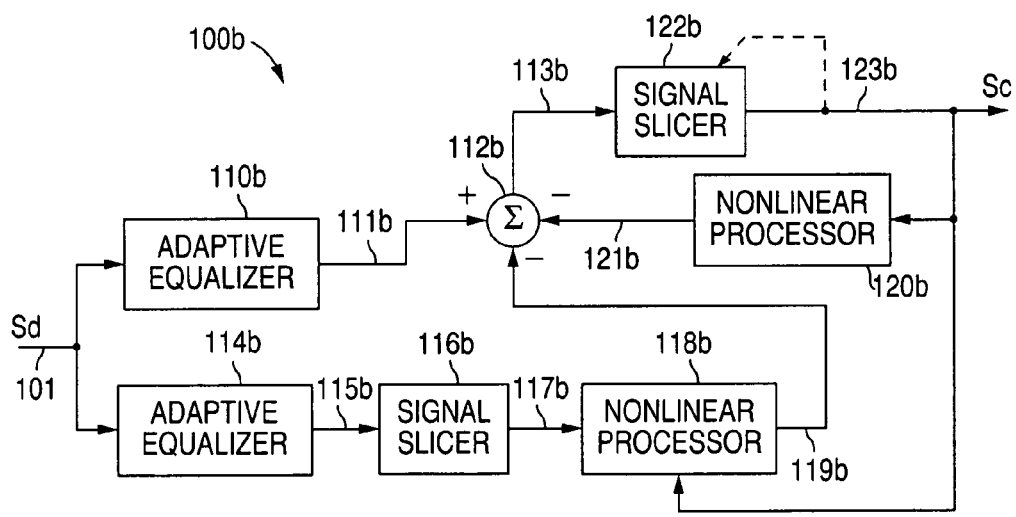

Referring to FIG. 5B, a compensation circuit 100b for reducing intersymbol interference products within an electrical data signal corresponding to a detected optical data signal received via an optical fiber in accordance with another embodiment of the presently claimed invention includes, in various combinations as will be discussed below: an adaptive equalizer 110b; a signal combiner 112b; another adaptive equalizer 114b; a signal slicer 116b; a nonlinear signal processor 118b; another nonlinear signal processor 120b; and another signal slicer 122b; all interconnected substantially as shown. The electrical data signal 101, corresponding to the detected optical data signal, generally in the form of a voltage signal generated by a transimpedance amplifier (not shown) from the electrical current signal produced by the photodetector, contains a sequence of data symbols. Such data symbol sequence includes a present data symbol, a sequence of past data symbols and a sequence of future data symbols. The present data symbol is that which is sought to be detected correctly at any given point in time, while the past data symbols are those which have preceded the present data symbol, and the future data symbols are those which will follow the present data symbol. This electrical data signal 101 is processed by the first adaptive equalizer 110b in accordance with well known adaptive equalization techniques. The resulting adaptively equalized signal 111b is provided to the signal combining circuit 112b. The equalization provided by this adaptive equalizer 110b substantially removes data signal component T2 representing the ISI product of the future data symbol sequence as defined above.

The electrical data signal 101 is also adaptively equalized by the other adaptive equalizer 114b in accordance with well known adaptive equalization techniques. That resulting equalized signal 115b is processed, e.g., detected, in the signal slicer 116b. The resulting sliced signal 117b corresponds to the ISI products of the future data symbol sequence portion ("i>0") of data signal component T5 as defined above, and is provided to the nonlinear signal processor 118. (This slicing, or thresholding, function has the effect of causing this signal 117b to represent tentative decisions as to the expected values of future data symbols within the sequence of data symbols of the electrical data signal 101.)

The nonlinear signal processor 118b (discussed in more detail below) processes this sliced signal 117b together with another sliced signal 123b (discussed in more detail below) which represents the ISI product of the past data symbol sequence portion ("j<0") of data signal component T5 as defined above. The resulting processed signal 119b, therefore, approximately duplicates data signal component T5 representing the ISI products of the past and future data symbol sequences as defined above, and is provided to the signal combining circuit 112b.

Another nonlinear signal processor 120b also processes this second sliced signal 123b to produce a processed signal 121b in which data signal component T4 representing the ISI product of the past data symbol sequence as defined above is approximately duplicated. This signal 121b is also provided to the signal combining circuit 112b.

The signal combining circuit 112b combines its input signals 111b, 119b, 121b by selectively combining the first adaptively equalized signal 111b, the first nonlinearly processed signal 119b and the second nonlinearly processed signal 121b, e.g., by subtracting from the first adaptively equalized signal 111b the first nonlinearly processed signal 119b and the second nonlinearly processed signal 121b. The resultant signal 113b, therefore, has had data signal components T2, T4, and T5 substantially removed, thereby leaving only the desired data signal component T1 (i.e., the present, or desired data symbol) and data signal component T3 which represents the ISI product of the past data symbol sequence.

The second signal slicer 122b slices this signal 113b, thereby substantially removing data signal component T3, to produce the second sliced signal 123b. In accordance with a preferred embodiment of the presently claimed invention, the output signal slicer 122b is an adaptive signal slicer in which the sliced output signal 123b is fed back for purposes of adaptively modifying the threshold used within the signal slicer 122b. This adaptive threshold function can be achieved in accordance with any of a number of conventional techniques and is discussed in more detail below.

Alternatively, and in more specific detail, the operation of the circuitry of FIG. 5B can be described as follows. To compensate the pre-cursor ISI term T2, a linear, pre-cursor equalizer in the form of adaptive equalizer 110b is used. This filter is preferably a feedforward transversal filter. For example, adaptive equalizer 110b can be a symbol-spaced transversal filter with the following impulse response:

$$h_B(t) = \sum_{k_1=-L_1}^{L_2} \sum_{k_2=0}^{K-1} d_{k_1 K + k_2} \delta\left(t - k_1 T - k_2 \frac{T}{K}\right)$$

The output of this filter at time t=0 may be expressed as:

$$y(0) = \bar{B} P \underline{d} + \underline{N}_1^T \underline{d}$$

$$= \underline{d}^T P^T \bar{B}^T + \underline{N}_1^T \underline{d}$$

where,

The vector $\underline{b}[k]$ with binary components denotes a suitably indexed form of $\{a_i \cdot a_j\}_{i,j}$ as at time k. Note that successive $\underline{b}[k]$ may be obtained by time-shifting the indices. Thus, we denote m=(i, j) with this ordering. If we assume, $n_1$ precursor and $n_2$ postcursor ISI symbols due to chromatic dispersion, $$dim(\underline{b}[k]) = n_1 + n_2 + 1 + \binom{n_1 + n_2 + 1}{2}.$$

E.g., let $n_1=n_2=1$. Then, we can select $\underline{b}^T[0]=[a_0^2\ a_1^2\ a_{-1}^2\ a_0 a_1\ a_0 a_{-1}\ a_1 a_{-1}]$. In this case, we have $\underline{b}^T[1]=[a_1^2\ a_2^2\ a_0^2\ a_1 a_2\ a_1 a_0\ a_2 a_0]$ and so on.

The matrix P[m, k] denotes the indexed form (using the same indexing form as above) of $\{a_1(p_{i,j}(kT) + a p_{i,j}(kT+\tau))\}_{i,j}$.

$$P = \begin{bmatrix} P\left[:,-L_1K-\left\lfloor\frac{K}{2}\right\rfloor:-L_1K+\left\lceil\frac{K}{2}\right\rceil-1\right] & 0 & \cdots & 0 \\ 0 & P\left[:,(-L_1+1)K-\left\lfloor\frac{K}{2}\right\rfloor:(-L_1+1)K+\left\lceil\frac{K}{2}\right\rceil-1\right] & & \vdots \\ \vdots & 0 & \cdot & 0 \\ 0 & \cdots & 0 & P\left[:,L_2K-\left\lfloor\frac{K}{2}\right\rfloor:L_2K+\left\lceil\frac{K}{2}\right\rceil-1\right] \end{bmatrix};$$

$\overline{B}=[\underline{b}^T[-L], \ldots, \underline{b}^T[L_2]]$

The ISI term T5 is compensated by a combination of different filter structures. This includes a nonlinear processor 118b, which produces a scaled sum based on the designed weighting coefficients of the filter $$h_C(t) = \sum_k f_k \delta(t-kT)$$

of products of symbols. The output of the nonlinear processor 118b is a sequence of the following form:

$$\sum_{i>0, j<0} f_{(i,j)} \hat{a}_i \hat{a}_j.$$

Estimates of the past symbols $\{\hat{a}_j\}_{j<0}$ are obtained from the output signal slicer 122a, which serves as a Final Decision block, while estimates of the future symbols $\{\hat{a}_i\}_{i>0}$ are obtained from the other signal slicer 116b, which serves as a Tentative Decision block. This Tentative Decision block can be a simple two-level slicer. Due to the possibility of error propagation as the decisions are only tentative, improved performance may be expected using a three-level slicer with the middle level indicating an erasure or no-decision.

The associated adaptive equalizer 114b is preferably adaptive and fractionally-spaced (fractional spacing=T/K), but can also be fixed and symbol-spaced as well, and this filter 114b is of the form $$h_A(t) = \sum_{k_1, k_2} g_k \delta\left(t - k_1 T - k_2 \frac{T}{K}\right).$$

This filter 114b together with the slicer 116b predicts the future symbols. The MMSE choice for this filter may be shown to be:

$\underline{g}^T = E(a_0 \overline{B}) P(P E(\overline{B}^T \overline{B}) P^T +$ $E(\underline{N}_+ \underline{N}_+^T))^{-1}.$ The matrix $E(a_0 \overline{B})$ may be easily computed. Note that, with $0 \neq i \neq j$, $E(a_0^2) = E(a_0) = \frac{1}{2},$ $E(a_0 \cdot a_0 a_i) = E(a_0 a_i) = \frac{1}{4},$ $E(a_0 \cdot a_i a_j) = \frac{1}{8}.$ Also, $E[\overline{B}^T \overline{B}]$ depends on the indexing and is easily computed. Continuing with the example discussed earlier in the Section, and with $L_1 = L_2 = 1$, $K=1$, $E(a_0 \overline{B}) = [0.25\ 0.5\ 0.25\ 0.25\ 0.125\ 0.25\ 0.5\ 0.25\ 0.25\ 0.25\ 0.25\ 0.125\ 0.25\ 0.25\ 0.5\ 0.125\ 0.25\ 0.25]$ The slicer 116b following this filter 114b will then provide estimates of the future data symbols $\{\hat{a}_i\}_{i>0}$. Note that while a simple 2-level slicer could certainly be used for block 116b, due to the possibility of error propagation as the decisions are only tentative, improved performance may be expected using a 3-level slicer. In such a structure the middle level would indicate an erasure or no-decision. Note also that the estimate of the past symbols $\{\hat{a}_j\}_{j<0}$ are obtained from the Final Decision block.

The MSE for this filter (using the 2-level slicer) can then be shown to be:

$\epsilon = \frac{1}{2} - E(a_0 \overline{B}) P \overline{g}.$

Using these "tentative" decisions as well as the estimates of the past decisions, the nonlinear processor 118b then forms a sum of products of the form:

$$y_1 = \sum_{i>0, j<0} c_{(i,j)} \hat{a}_i \hat{a}_j.$$

We now consider $\underline{b}_{fp}$ to be the binary vector formed by a suitable indexing of the binary OOK symbols: $\{a_1 \cdot a_j\}_{i>0, j\leq 0}$. E.g., continuing our example, $\underline{b}_{fp}$ can be $[a_1 a_0\ a_1 a_{-1}]$ Let $\underline{c}$ denote the coefficient vector formed by the corresponding indexing of the coefficients $\{c_{(i,j)}\}$. Thus, $y_1 = \underline{c}^T \underline{b}_{fp}.$ The ISI term T3 which also contains the desired symbol, albeit scaled by past symbols, is compensated by the output signal slicer 122b, which preferably includes a two-level slicer and can also contain a finite impulse response ("FIR") filter with appropriate weightings of past symbols. To quantify this term, let $\underline{B}_r = a_0 \underline{b}_p$ denote the vector formed by the product of the current symbol $a_0$ with the past symbols (thus, in our example, $\underline{B}_r = [a_0 \cdot a_{-1}]$) and let $P_r^T$ denote the submatrix $P^T$ of obtaining by restricting to the columns the columns of $P^T$ which are multiplied by $\underline{B}_r$ which is a sub-vector of $\overline{B}^T$. Then the ISI term (T3) as output by the FTE B may be expressed as:

$y_3^{(1)} = a_0 \underline{d}^T P_r^T \underline{b}_p = a_0 y_3.$

It should be noted that the threshold in this slicer 122b can be adapted based on a table as a function of past decisions that have been made. Such table can have up to $2^M$ entries where M is the length of the post-cursor ISI in number of symbols. Another alternative, is to suppress this term altogether which will result in some loss of performance as the signal power in the term is not used effectively. In the latter case, the Adaptive Thresholder is simply a slicer. We further discuss these alternatives below.

The ISI term T4 is compensated using another nonlinear processor 120b, which produces a scaled sum based on the designed weighting coefficients of the filter $$h_D(t) = \sum_k h_k \delta(t - kT)$$

of products of symbols. The output of this nonlinear processor 120b is a sequence of the following form:

$$\sum_{i<0, j<0} h_{(i,j)} \hat{a}_i \hat{a}_j.$$

We now consider $\underline{b}_{pp}$ to be the binary vector formed by a suitable indexing of the binary OOK symbols: $\{\hat{a}_i \hat{a}_j\}_{i<0, j<0}$. Continuing our example, $\underline{b}_{pp} = [a_{-1}{}^2]$. Let $\underline{h}$ denote the coefficient vector formed by the corresponding indexing of the coefficients $\{h_{(i,j)}\}$. Thus, $$y_2 = \underline{h}^T \underline{b}_{pp}.$$

Estimates of past symbols $\{\hat{a}_j\}_{j<0}$ are obtained from the Final Decision block 122b.

The weighting coefficients for the adaptive equalizers 110b, 114b as well as the weighting coefficients for the nonlinear filters 118b, 120b can be designed with least-mean square ("LMS") or zero-forcing criteria.

The input to the Adaptive Thresholder block, which contains the final slicer, may then be expressed as:

$$s(0) = \underline{d}^T P^T \overline{B}^T - \underline{c}^T \underline{b}_{fp} - \underline{h}^T \underline{b}_{pp} + \underline{d}^T \underline{N}_1.$$
$$= \overline{A} \underline{\tilde{c}}$$

where: $\overline{A} = [\overline{B}P + \underline{N}_1^T \quad -\underline{b}_{fp}^T \quad -\underline{b}_{pp}^T]$; $\underline{\tilde{c}} = \begin{bmatrix} \underline{d} \\ \underline{c} \\ \underline{h} \end{bmatrix}$.

The slightly worse criterion which does not need adaptive thresholding, is to minimize:

$$\epsilon = E[(s(0) - a_0)^2].$$

Here for the MMSE criterion, it may be shown below in equation M1 that:

where: P is the channel correlation matrix (known a priori based upon the data channel characteristics); B is the data correlation matrix (known a priori based upon the data symbols being transmitted); $N_1$ is the noise correlation matrix (known a priori based upon the noise characteristics of the data channel); $b_{fp}$ is the correlation vector for future and past data symbols; $b_{pp}$ is the correlation vector for past data symbols; and $b_{ff}$ is the correlation vector for future data symbols.

The MSE for this filter can then be shown to be:

$$1/2 - [E(a_0 \overline{B})P \quad -E(a_0 \underline{b}_{fp}^T) \quad -E(a_0 \underline{b}_{pp}^T)] \underline{\tilde{c}}.$$

The improved criterion discussed above is to minimize:

$$\epsilon = E[(s(0) - a_0(1 + y_3))^2].$$

Choosing the optimized filters as discussed above followed by the Adaptive Thresholder wherein $y_3$ a function of the past symbols and the threshold is adapted based on the value of $1 + y_3$, will minimize the above error metric. Alternatively, the operation for forming the term $$\frac{s(0)}{1 + y_3}$$

may be approximated as $s(0)(1 - y_3)$ and may be formed by multiplying the signal $s(t)$ with $(1 - y_3)$. The latter signal term may be obtained using an FIR filter F with adaptive or fixed coefficients and with past and/or future symbols input to F.

A few important deviations and/or sub-optimalities of the Example NL-DFE, that are other realizations of the General NL-DFE, are worth considering.

The first deviation is if the term (T5) is not directly suppressed. In this case, the NL-DFE1 can be seen to be a simple generalization of the OL-DFE, where the feedback consists of past symbols as well as products of past symbols. In this case, we define the filter coefficients to be optimized as:

$$\underline{\tilde{c}}^{(1)} = \begin{bmatrix} \underline{d} \\ \underline{h} \end{bmatrix}.$$

$$\underline{\tilde{c}}^T = [E(a_0 \overline{B})P \quad -E(a_0 \underline{b}_{fp}^T) \quad -E(a_0 \underline{b}_{pp}^T)] \begin{bmatrix} P^T E(\overline{B}\overline{B}^T)P + E(\underline{N}_1 \underline{N}_1^T) & -P^T E(\overline{B} \underline{b}_{fp}^T) & -P^T E(\overline{B} \underline{b}_{pp}^T) \\ -E(\underline{b}_{fp} \overline{B}^T)P & E(\underline{b}_{fp} \underline{b}_{fp}^T) & E(\underline{b}_{fp} \underline{b}_{pp}^T) \\ -E(\underline{b}_{pp} \overline{B}^T)P & E(\underline{b}_{pp} \underline{b}_{fp}^T) & E(\underline{b}_{pp} \underline{b}_{pp}^T) \end{bmatrix}^{-1}$$

Then it can be shown that for the MMSE criterion:

$$\underline{\tilde{c}}^{(1)} = [E(a_0 \overline{B})P \quad -E(a_0 \underline{b}_{pp}^T)] \begin{bmatrix} P^T E(\overline{B}^T \overline{B})P + E(\underline{N}_1 \underline{N}_1^T) & -P^T E(\overline{B}^T \underline{b}_{pp}^T) \\ -E(\underline{b}_{pp} \overline{B})P & E(\underline{b}_{pp} \underline{b}_{pp}^T) \end{bmatrix}^{-1}.$$

The MSE for this filter is then shown to be:

$$1/2 - [\,E(a_0\overline{B})P \quad -E(a_0\underline{b}_{pp}^T)\,]\underline{\tilde{c}}^{(1)}.$$

The second deviation is if the products of the tentative future symbols and possibly, tentative current symbol are formed and subtracted from the input to the final decision slicer as well. In this case, $$s(0) = \underline{d}^T P^T \overline{B}^T - \underline{c}^T \underline{b}_{fp} - \underline{h}^T \underline{b}_{pp} - \underline{e}^T \underline{b}_{ff} + \underline{d}^T \underline{N}_1$$

$$= \overline{A}^{(2)} \underline{\tilde{c}}^{(2)}$$

where $$\overline{A}^{(2)} = [\overline{B}P + \underline{N}_1^T - \underline{b}_{fp}^T - \underline{b}_{pp}^T - \underline{b}_{ff}^T]; \quad \underline{\tilde{c}} = \begin{bmatrix} \underline{d} \\ \underline{c} \\ \underline{h} \\ \underline{e} \end{bmatrix}.$$

Note that the vector $\underline{b}_{ff}$ above may contain products of the current and future symbols as well in addition to products of future and future symbols, but does not contain the product of the current symbol with itself. Here for the MMSE criterion, it may be shown that:

$$\underline{\tilde{c}}^{(2)T} = [\,E(a_0\overline{B})P \quad -E(a_0\underline{b}_{fp}^T) \quad -E(a_0\underline{b}_{pp}^T) \quad -E(a_0\underline{b}_{ff}^T)\,] \begin{bmatrix} P^T E(\overline{B}^T\overline{B})P + E(\underline{N}_1\underline{N}_1^T) & -P^T E(\overline{B}^T \underline{b}_{fp}^T) & -P^T E(\overline{B}^T \underline{b}_{pp}^T) & -P^T E(\overline{B}^T \underline{b}_{ff}^T) \\ -E(\underline{b}_{fp}\overline{B})P & E(\underline{b}_{fp}\underline{b}_{fp}^T) & E(\underline{b}_{fp}\underline{b}_{pp}^T) & E(\underline{b}_{fp}\underline{b}_{ff}^T) \\ -E(\underline{b}_{pp}\overline{B})P & E(\underline{b}_{pp}\underline{b}_{fp}^T) & E(\underline{b}_{pp}\underline{b}_{pp}^T) & E(\underline{b}_{pp}\underline{b}_{ff}^T) \\ -E(\underline{b}_{ff}\overline{B})P & E(\underline{b}_{ff}\underline{b}_{fp}^T) & E(\underline{b}_{ff}\underline{b}_{pp}^T) & E(\underline{b}_{ff}\underline{b}_{ff}^T) \end{bmatrix}^{-1}$$

The MSE for this filter is then shown to be:

$$1/2 - [\,E(a_0\overline{B})P \quad -E(a_0\underline{b}_{fp}^T) \quad -E(a_0\underline{b}_{pp}^T) \quad -E(a_0\underline{b}_{ff}^T)\,].$$

The Final Decision Block could be a simple slicer.

Yet another deviation, is if the linear DFE is used as the Tentative Decision Block. This will provide improved tentative decisions. Thus, the slicer following the FTE-A block will have a feedback loop filter with coefficients $\underline{m}$. Thus, if $$\underline{\overset{\Box}{p}} = \begin{bmatrix} \underline{g} \\ \underline{m} \end{bmatrix},$$

the optimal coefficients can be shown to be $$\underline{\tilde{c}}^T = [\,E(a_0\overline{B})P \quad -E(\,a_0\overline{B}_r)\,] \begin{bmatrix} P^T E(\overline{B}^T\overline{B})P + E(\underline{N}_1\underline{N}_1^T) & -P^T E(\overline{B}^T \overline{B}_r) \\ -E(\overline{B}_r^T\overline{B})P & E(\overline{B}_r^T\overline{B}_r) \end{bmatrix}^{-1}.$$

Note that $$E(a_0\overline{B}_r) = \tfrac{1}{4}\overline{J}$$

where the vector $\overline{J}$ has all components=1 and has same dimension as $\overline{B}_r$.

The General NL-DFE block or any of its realizations may be cascaded (e.g., via the "pre" slicer output Scp) with another General NL-DFE block (different filter coefficients) for improved estimates of the tentative decisions and improved resulting performance.

To account for certain other fiber non-linearity effects including self-phase modulation, it may also be useful to form products of 3 adjacent symbols and cancel these within the NL-DFE framework. This results in a straightforward extension of the General NL-DFE. Note that the weighted sum of products of the 3 adjacent symbols may have terms of the form of the product of 3 past adjacent symbols, the product of tentative current and 2 past symbols, the product of 1 tentative future, tentative current and past symbol, the product of 2 tentative future and tentative current symbol, and/or the product of 3 tentative future symbols.

Consistent with the principles of the present invention, it should be appreciated that the data signal component-specific nature of the compensation provided, as discussed above, need not necessarily be performed upon all four of the undesired data signal components (T2, T3, T4 and T5).

For example, compensation can be limited or applied primarily to the following individual data signal components or combinations of data signal components as follows (with no significance attached to the order in which they are listed): signal components T2 and T3; signal components T2, T3 and T4; signal components T2, T3 and T5; signal components T2 and T4; signal components T2, T4 and T5; and signal components T2 and T5. Similarly, compensation can be limited or applied primarily as follows: signal components T3 and T4; signal components T3, T4 and T5; and signal components T3 and T5. Further similarly, compensation can be limited or applied primarily as follows: signal component T4; signal components T4 and T5; and signal component T5.

In those cases in which fewer than all four undesired data signal components are compensated, based upon the foregoing discussion and the circuit of FIG. 5B, it should be understood that the circuit connections would be modified as follows. Where no compensation is to be provided for data signal component T2, the first adaptive equalizer 110b is not used or is bypassed and the electrical data signal 101 is provided directly to the "positive" input terminal of the signal combining circuit 112b. Where no compensation for data signal component T3 is to be provided, the second signal slicer 122b is a fixed-threshold signal slicer instead of an adaptive signal slicer (discussed in more detail below).

Where no compensation for data signal component T4 is to be provided, the second nonlinear signal processor 120b is not used and no connection is made to the corresponding "negative" input to the signal combining circuit 112b. Similarly, where no compensation for data signal component T5 is to be provided, the second adaptive equalizer 114*b*, the first signal slicer 116*b* and first nonlinear signal processor 118*b* are not used and no connection is made to the corresponding "negative" input to the signal combining circuit 112*b*.

Based upon the foregoing discussion, a number of principles, characteristics and features of the present invention should be evident. First, the beneficial data signal compensation provided in accordance with the present invention is not limited to electrical data signals detected from optical data signals. Indeed, such compensation techniques can be applied to any electrical data signal corresponding to a detected data signal received via a signal transmission medium, with an optical medium merely being one example.

Second, the signal model used for purposes of determining how best to apply compensation to the various components of the data signal is not limited to that presented above. The signal model discussed above has been presented as an example for purposes of illustrating the more general feature of the present invention, i.e., selective application of compensation to individual, discrete data signal components.

For example, the topology, or architecture, of the circuit and functions as depicted in FIG. 5B advantageously allows compensation to be selectively applied to individual, discrete data signal components by performing four major functions. The circuit branch containing the first adaptive equalizer 110*b* processes the electrical data signal 101 in such a manner as to substantially remove one distinct signal component representing an ISI product of some portion of the data symbol sequence (e.g., a portion of the future data symbol sequence, as discussed for the example above). The circuit branch containing equalization and processing circuitry in the form of the other adaptive equalizer 114*b*, signal slicer 116*b* and nonlinear signal processor 118*b* approximately duplicates an ISI product of another portion of the data symbol sequence (e.g., portions of the past and future data symbol sequences, as discussed for the example above) for removal, e.g., by subtraction, within the signal combiner 112*b* from the compensated signal 111*b* provided by the first adaptive equalizer 110*b*. The circuit branch containing output processing circuitry in the form of the other signal slicer 122*b* and nonlinear signal processor 120*b* approximately duplicates an ISI product of still another portion of the data symbol sequence (e.g., another portion of the past data symbol sequence, as discussed for the example above) for removal, e.g., by subtraction, within the signal combiner 112*b* from the compensated signal 111*b* provided by the first adaptive equalizer 110*b*.

Figure 5C:
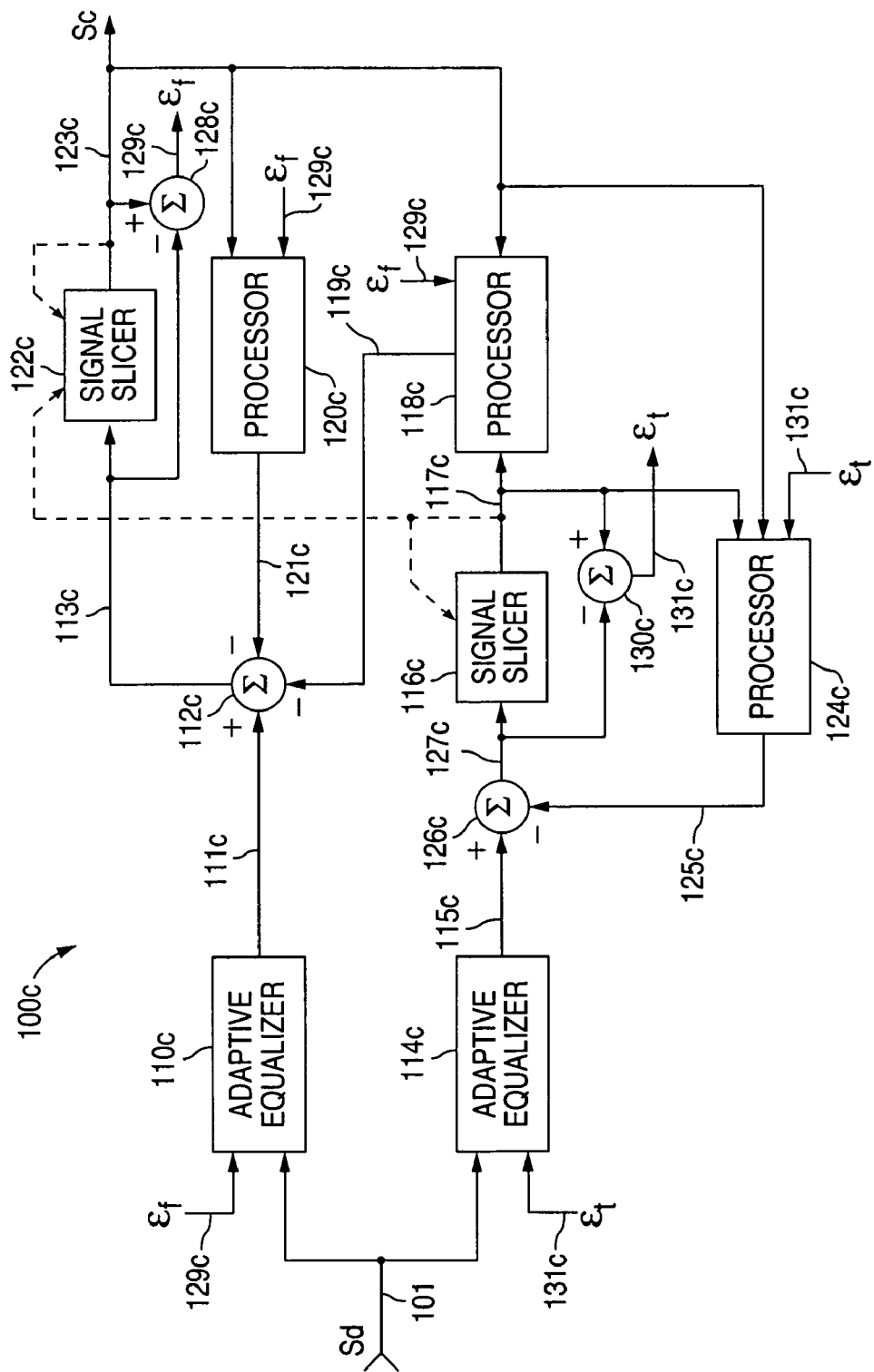

Referring to FIG. 5C, a compensation circuit 100*c* for reducing intersymbol interference products within an electrical data signal corresponding to a detected optical data signal received via an optical fiber in accordance with another embodiment of the presently claimed invention is a further variation on the circuits 100*a*, 100*b* of FIGS. 5A and 5B. While sharing many of the same or similar processing elements or circuits, this compensation circuit 100*c* includes some additional elements or circuits, as well as illustrates how some of the elements or circuits discussed above can be varied somewhat in implementation or function.

As for new circuit elements, this compensation circuit 100*c* includes signal combining (e.g., summing or subtracting) circuit elements 128*c*, 130*c* for use with the final 122*c* and tentative 116*c* signal slicer circuits, plus a signal processor 124*c* and signal combining (e.g., summing or subtracting) circuit 126*c* for providing feedback for the tentative signal slicer 116*c* (discussed in more detail below). As for different, or alternative, implementations of previously discussed circuit elements, as discussed in more detail below, signal processors 118*c* and 120*c* need not necessarily be nonlinear processors. Additionally, the tentative signal slicer 116*c* can be an adaptive signal slicer, while the final signal slicer 122*c* can be implemented to be adaptive based on both its final output slice signal 123*c*, as well as the tentative slice signal 117*c*.

The signal combining circuit 128*c* associated with the final signal slicer 122*c* subtracts the pre-slice signal 113*c* from the post-slice signal 123*c* to generate an error signal 129*c* corresponding to the error, if any, between these two signals 113*c*, 123*c*. This error signal 129*c* is used by the first adaptive equalizer 110*c* for performing its adaptation of processing coefficients. This error signal 129*c* is also used by the feedback processor 120*c* and tentative signal processor 118*c* for adapting their respective processing coefficients.

The signal combining circuit 130*c* associated with the tentative signal slicer 116*c* subtracts its pre-slice signal 127*c* from its post-slice signal 117*c* to produce another error signal 131*c*. This error signal, associated with the tentative symbols or decisions, is used by the other adaptive equalizer 114*c* and the feedback processor 124*c* for adapting their respective processing coefficients.

The additional feedback processor 124*c* is preferably a nonlinear processor, such as a decision feedback equalizer (DFE). This processor 124*c* processes the tentative decision signal 117*c* or the final decision signal 123*c* or both signals 117*c*, 123*c* to produce a feedback signal 125*c* which is combined with (e.g., subtracted from) the incoming equalized signal 115*c* in the signal combining circuit 126*c* to produce the pre-slice signal 127*c*. As noted above, the tentative signal slicer 116*c* can also be adaptive under the control of its post-slice signal 117*c*. Also as noted above, this post-slice tentative symbol signal 117*c* can be used by the final signal slicer 122*c* for slicing its input signal 113*c* in an adaptive manner. As is well known in the art, such adaptive signal slicers can be implemented by using variable signal slicing thresholds, variable signal rise or fall times, or variable input signal scaling with fixed signal slicing thresholds (discussed in more detail below).

Regarding further alternative embodiments of this circuit 100*c*, it should be appreciated by one of ordinary skill in the art that the signal processors 118*c*, 120*c*, 124*c* (as well as their counterpart processors in the circuits of FIGS. 5A and 5B) can alternatively be linear processors, such as linear filters. Additionally, the feedback processor 124*c* for the tentative signal slicer 116*c* need not necessarily require two input signals. For example, this processor 124*c* can be implemented to process the tentative decision signal 117*c* or the final decision signal 123*c*, either linearly or nonlinearly, or both signals 117*c*, 123*c*, either linearly or nonlinearly.

Further, feedback processor 120*c* and tentative signal processor 118*c* can alternatively be implemented as decision feedback equalizers similar to the tentative signal slicer feedback processor 124*c*.

As is well known in the art, such nonlinear signal processors can be implemented using circuitry to perform summations of products of the input signal, or symbols, and processing coefficients. For example, for the generalized case of a two-input nonlinear processor, with x and y representing the input signals and c, d, e, f, g representing the processing coefficients, such processor would produce an output signal in accordance with the following equation (for a single-input nonlinear processor, either x or y would be set to zero):

$$\text{Output} = \sum_i c_i x_i + \sum_i d_i y_i + \sum_{i,j} e_{ij} x_i x_j + \sum_{i,j} f_{ij} y_i y_j + \sum_{i,j} g_{ij} x_i y_j$$

Additionally, it should be further appreciated that the equalized signal 115c corresponding to the tentative decision can be delayed using appropriate signal delay elements (well known in the art) such that the sliced signal 117c corresponding to the tentative decision and the final processed signal 119c corresponding to the processed tentative decision will represent either past, present, or future data symbols as compared to the input signal 113c to the final signal slicer 122c. Accordingly, it should be understood that the term "tentative" as used herein is intended to indicate an intermediate symbol or decision without necessarily requiring that such symbol or decision be past, present or future relative to any specific reference symbol or decision.

Figure 5D:
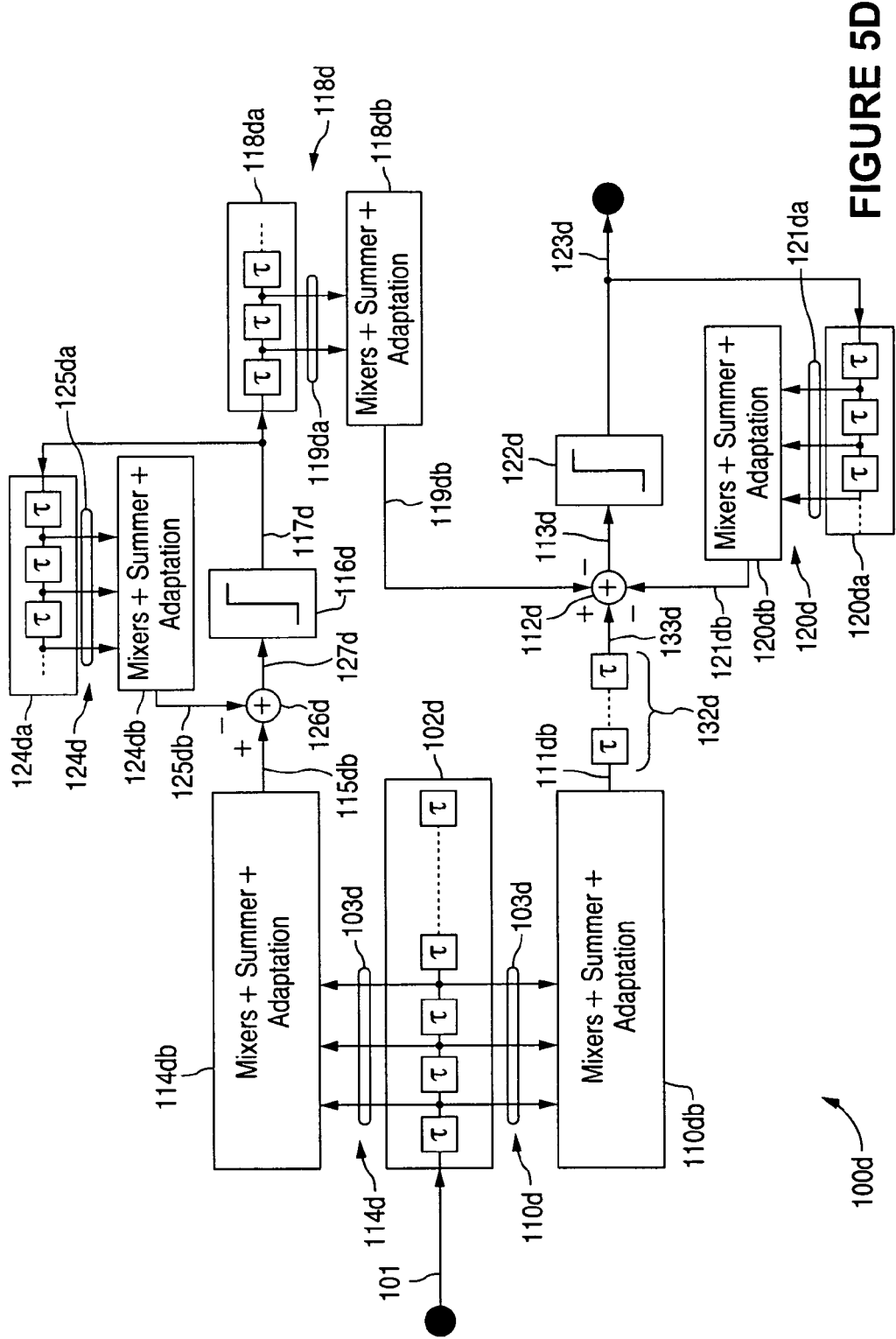

Referring to FIG. 5D, a compensation circuit 110d in accordance with another embodiment of the presently claimed invention is an implementation in which some circuit elements are shared and some alternative signal processing is introduced. In this implementation 100d, the two input adaptive equalizers 110d, 114d share a set 102d of circuit delay elements, with the resulting delayed signals 103d being used by the respective processing sections 110db, 114db in which such signals 103d are mixed and combined (e.g., summed) in an adaptive manner, e.g., using appropriate error signals (not shown) representing the errors between the pre-slice and post-slice signals associated with the signal slicers 122d, 116d (as discussed above).

The first equalized signal 111db is delayed via one or more signal delay elements 132d to provide a delayed equalized signal 133d from which two other signals 119db (discussed in more detail below), 121db (discussed in more detail below) are subtracted. The resulting pre-slice signal 113d is sliced by the final signal slicer 122d to produce the final decision signal 123d. This signal 123d is fed back to a feedback processor 120d where it is delayed by a set 120da of circuit delay elements to provide delayed signals 121da which are processed (e.g., mixed and summed in an adaptive manner) by an adaptive processor 120db. This produces the feedback signal 121db for combining with the delayed equalized signal 133d.

The other equalized signal 115db is received by a signal combining circuit 126d in which a feedback signal 125db is combined (discussed in more detail below). The resulting pre-slice signal 127d is sliced by the tentative signal slicer 116d to produce the tentative decision signal 117d. This signal 117d is fed back to another feedback processor 124d where it is delayed by a set 124da of circuit delay elements. The resulting delayed signals 125da are processed (e.g., mixed and summed in an adaptive manner) by another adaptive processor 124db to provide the feedback signal 125db for combining with (e.g., subtraction from) the equalized signal 115db. The tentative decision 117d is further delayed by another set 118da of circuit delay elements to provide another set 119da of delayed signals for processing (e.g., mixing and summing in an adaptive manner) by still another adaptive processor 118db to provide the processed tentative decision signal 119db for combining with (e.g., subtraction from) the delayed equalized signal 133d.

Figure 5E:
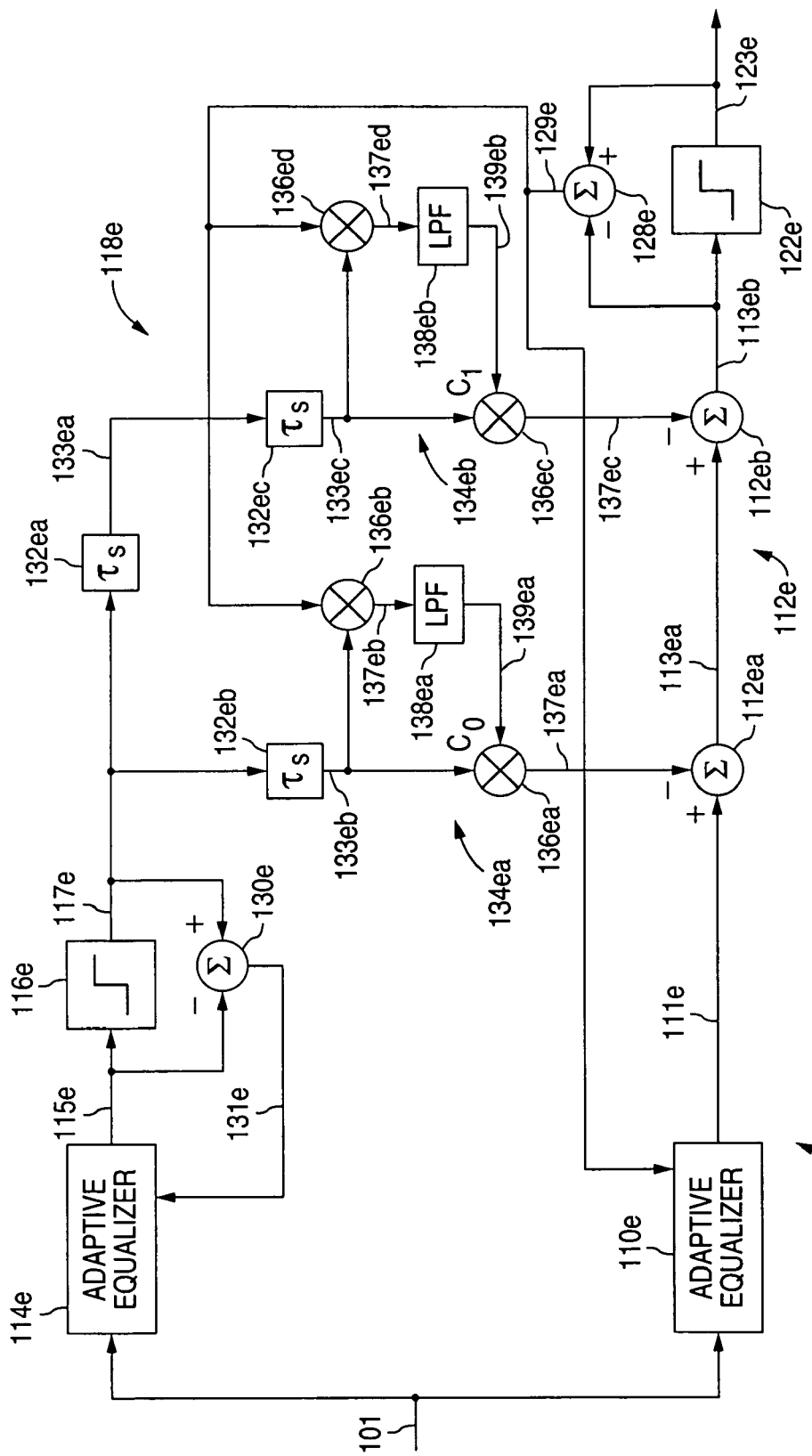

Referring to FIG. 5E, a compensation circuit 100e in accordance with another embodiment of the presently claimed invention illustrates a further alternative embodiment of the tentative decision processor 118e. The tentative decision signal 117e is processed through two signal branches. In one signal branch, this signal 117e is delayed by a circuit delay element 132eb to produce a delayed tentative decision signal 133eb which is multiplied by an adaptive coefficient signal 139ea within an adaptive multiplier circuit 134ea (discussed in more detail below) to produce a processed tentative decision signal 137ea.

Similarly, the tentative decision signal 117e is delayed by multiple signal delay elements 132ea, 132ec to provide another delayed tentative decision signal 133ec which is multiplied by another adaptive coefficient signal 139eb in another adaptive multiplier circuit 134eb (discussed in more detail below) to provide another processed tentative decision signal 137ec.

In conformance with the discussion above concerning the circuits of FIGS. 5A–5D, these processed tentative decision signals 137ea, 137ec are combined with (e.g., subtracted from) the equalized signal 111e to provide the pre-sliced signal 113eb for the final decision signal slicer 122e.

The adaptive multiplier circuits 134ea, 134eb can be described as follows. In the first adaptive multiplier circuit 134ea, the delayed tentative decision signal 133eb is multiplied in a mixer 136ea by the adaptive coefficient signal 139ea. The adaptive coefficient signal 139ea is produced by multiplying the delayed tentative decision signal 133eb by the error signal 129e representing the error between the pre-slice 113eb and post-slice 123e signals associated with the final decision signal slicer 122e. The resultant signal 137eb is filtered by a low pass filter 138ea (e.g., a series resistive circuit element followed by a shunt capacitive circuit element) to produce the adaptive coefficient signal 139ea. (The second adaptive multiplier circuit 134eb operates in a similar manner with corresponding circuit elements and signals.)

Figure 5F:
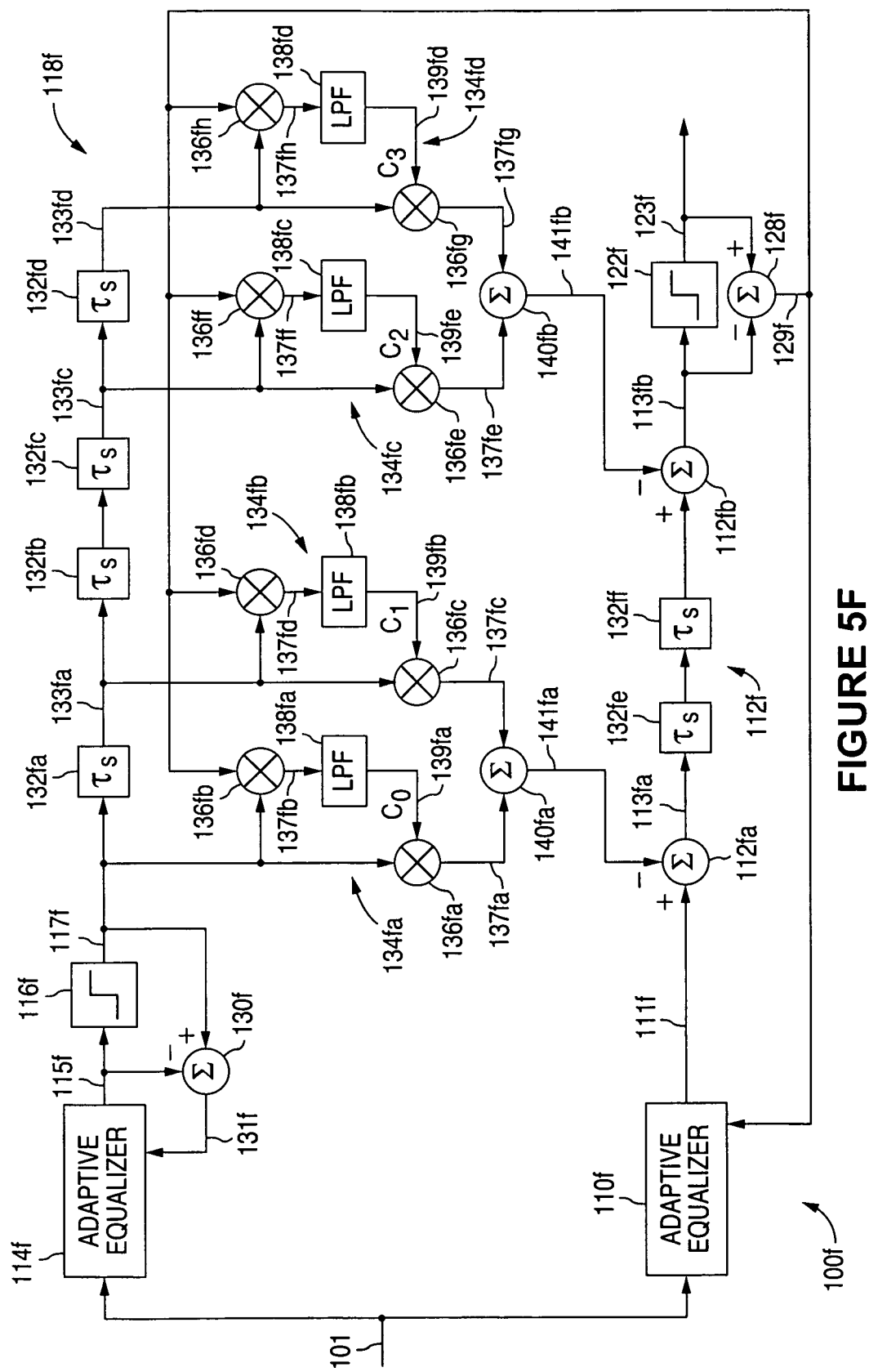

Referring to FIG. 5F, a compensation circuit 100f in accordance with another embodiment of the presently claimed invention uses a further alternative embodiment of the tentative decision signal processor 118f. Similar to the circuit 100e of FIG. 5E, the tentative decision signal 117f is processed in two signal branches which, in turn, include two circuit sub-branches. In the first circuit branch, the tentative decision signal 117f and a delayed version 133fa of such signal are processed in respective adaptive multiplier circuits 134fa, 134fb (discussed in more detail below) to produce adaptive signals 137fa, 137fc which are combined (e.g., summed) in a signal combining circuit 140fa to provide a processed tentative decision signal 141fa. Further delayed versions 133fc, 133fd of the tentative decision signal 117f are processed in the second circuit branch which includes adaptive multiplier circuits 134fc, 134fd in its circuit sub-branches. The resulting adaptive signals 137fe, 137fg are combined (e.g., summed) in a signal combining circuit 140fb to provide another processed tentative decision signal 141fb.

As in the circuits of FIGS. 5A–5E, these processed tentative decision signals 141fa, 141fb are combined with (e.g., subtracted from) the equalized signal 111f in the signal combining circuit 112f. Signal delay elements 132fe, 132ff are included in the final signal combining circuit 112f to correspond to the initial signal delay elements 132fb, 132fc used in producing the second processed tentative decision signal 141fb so as to properly time-align such signal 141fb for its combination with the delayed equalized signal 133ff.

The adaptive multiplier circuits 134fa, 134fb, 134fc, 134fd produce respective adaptive coefficient signals 139fa, 139*fb*, 139*fc*, 139*fd* in conformance with the discussion above for the adaptive multiplier circuits 134*ea*, 134*eb* of the circuit 100*c* of FIG. 5E.

Figure 6A:
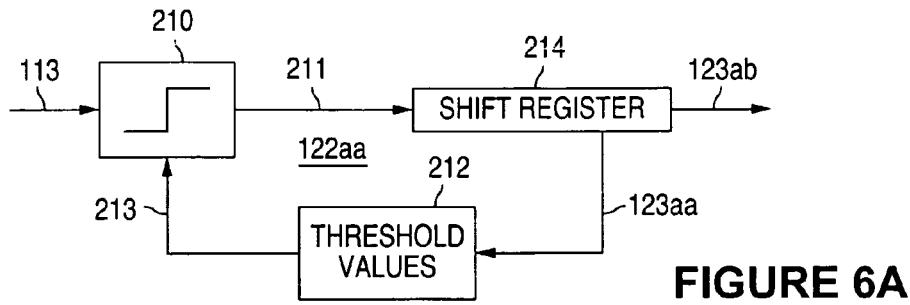
FIGS. 6A, 6B, 6C and 6D are functional block diagrams of examples of adaptive signal slicers suitable for use in the circuits of FIGS. 5A–5F.

Referring to FIG. 6A, one example of an adaptive signal slicer 122*aa* suitable for use in the circuits of FIGS. 5A–5F has a slicing, or threshold, circuit 210 having a threshold which is controlled or provided by a threshold control signal 213 from a threshold value circuit 212. The sliced data 211 is provided to a shift register 214, the contents 123*aa* of which are used to determine the threshold control signal 213 provided by the threshold value circuit 212. In one embodiment, this threshold value circuit 212 can be a memory circuit, such as a random access memory or lookup table, which uses the shift register output 123*aa* as an address signal for selecting the appropriate output 213 for use as the threshold data or control signal.

Figure 6B:
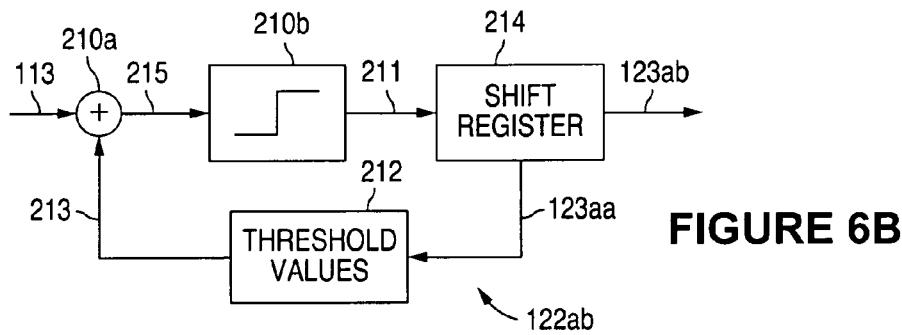

Referring to FIG. 6B, another example of an adaptive signal slicer 122*ab* suitable for use in the circuits of FIGS. 5A–5F has a signal summing, or scaling, stage 210*a* in which the incoming signal 113 is summed, or scaled in accordance, with the threshold control signal 213 from the threshold value circuit 212. The scaled signal 215 is sliced by the slicing, or threshold, circuit 210*b* using a fixed threshold. As before, the sliced data 211 is provided to a shift register 214, the contents 123*aa* of which are used to determine the threshold control signal 213 provided by the threshold value circuit 212. (Alternatively, in place of the scaling stage 210*a*, threshold control signal 213 and threshold value circuit 212, a variable gain stage, gain control signal and gain control circuit, respectively (not shown), can be used, whereby the variable gain stage would amplify or attenuate the incoming signal 113 in accordance with the gain control signal provided by the gain control circuit.)

Figure 6C:
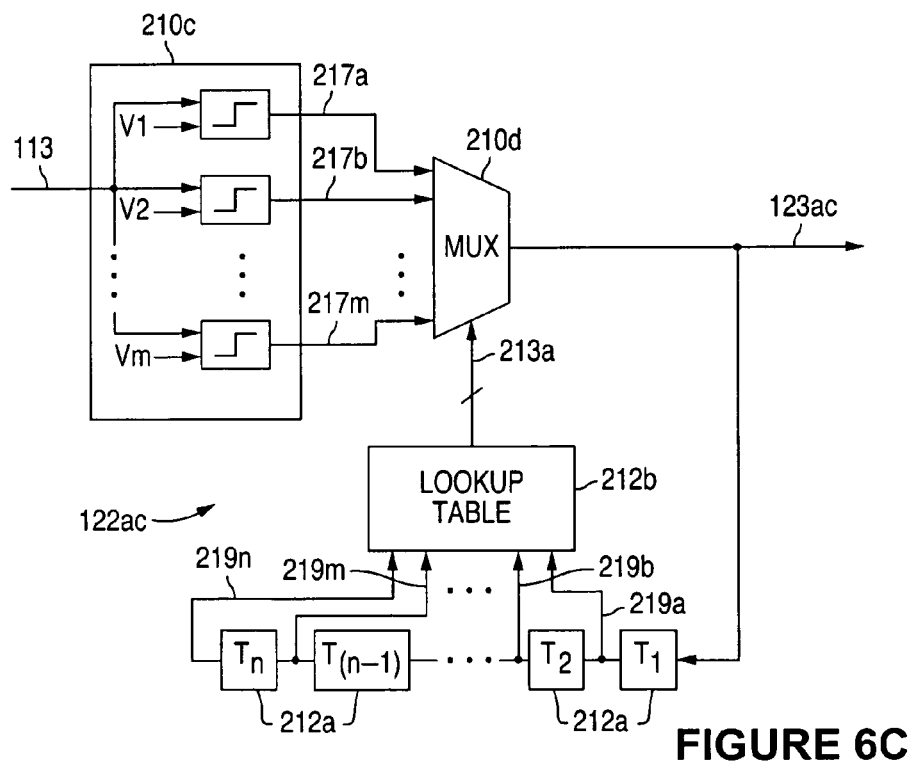

Referring to FIG. 6C, still another example of an adaptive signal slicer 122*ac* suitable for use in the circuits of FIGS. 5A–5F has a multiple-level (e.g., m levels) slicer 210*c* in which the incoming signal is compared against m thresholds V1, V2, V3, . . . , Vm, with one of the m sliced signals 217*a*, 217*b*, . . . , 217*m* selected by a multiplexor 210*d*. The output 123*ac* of the multiplexor 210*d* is sequentially delayed by a number of delay elements 212*a* (e.g., a shift register), with the resultant delayed signals 219*a*, 219*b*, . . . , 219*n* used to address a memory element (e.g., a lookup table) 212*b*, the output 213*a* of which controls the multiplexor 210*d*.

Figure 6D:
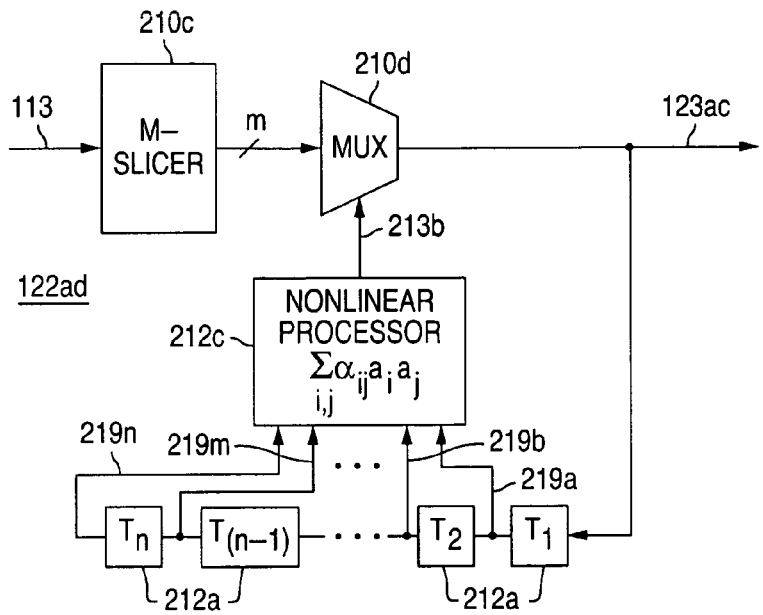

Referring to FIG. 6D, yet another example of an adaptive signal slicer 122*ad* suitable for use in the circuits of FIGS. 5A–5F also has the multiple-level slicer 210*c* and multiplexor 210*d*. In this circuit 122*ad*, the delay elements 212*a* in cooperation with a nonlinear processor 212*c* use the delayed signals 219*a*, 219*b*, . . . , 219*n* to produce a sum of products, the result 213*b* of which controls the multiplexor 210*d*.

Figure 6E:
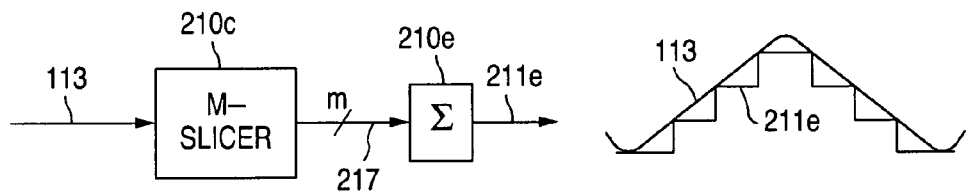
FIG. 6E is a functional block diagram of a use of the multiple-level slicers of the signal slicers of FIGS. 6C and 6D to provide a multiple-level sliced output signal.

Referring to FIG. 6E, an analog implementation in which a multiple-level sliced signal is desired sums the m-output slice signals 217 from the multiple-level slicers 210*c* (FIGS. 6C and 6D) with analog signal summing circuitry 210*e* to produce a multiple-level analog signal 211*e*. For example, as shown, where the incoming signal 113 is a sine wave and m=4, the output signal 211*e* will have four discrete levels.

Figure 6F:
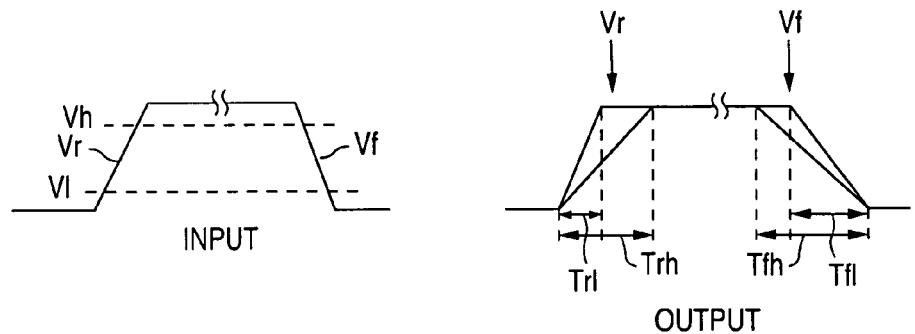
FIG. 6F illustrates graphical representations of how the adaptive signal slicers of FIGS. 6A, 6B, 6C and 6D can be implemented to selectively control the slicing thresholds for the input signal and the rise and fall times for the output signal.

Referring to FIG. 6F, the adaptive signal slicers 122*aa*, 122*ab*, 122*ac*, 122*ad* of FIGS. 6A, 6B, 6C and 6D can be implemented to allow selective control of the slicing thresholds for the input signal and the rise and fall times for the output signal, as well as the differences between them thereby allowing hysteresis to be introduced in terms of slicing thresholds, rise and fall times, or both. For example, based upon the adaptive signal slicer architectures as depicted, it will be appreciated that the slicing thresholds for the input signal can be selectively controlled such that the respective slicing thresholds for the rising Vr and falling Vf portions of the input signal can be individually selected to be anywhere within the available lower Vl and upper Vh limits. Slicing threshold hysteresis can be introduced by making such slicing thresholds different. Similarly, the rise and fall times for the output signal can be selectively controlled such that the rise Tr and fall Tf times for the rising Vr and falling Vf portions of the output signal can be selected to be anywhere within the available lower Trl, Tfl and upper Trh, Tfh limits. Rise and fall time hysteresis can be introduced by making such rise and fall times different.

Figure 7A:
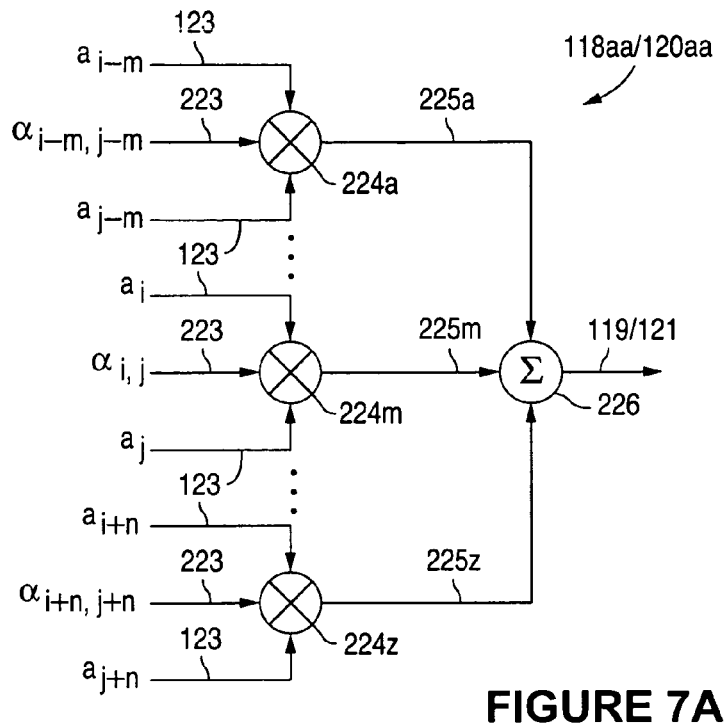
FIGS. 7A and 7B are functional block diagrams of examples of nonlinear signal processors suitable for use in the circuits of FIGS. 5A–5F.

Referring to FIG. 7A, one example of a nonlinear signal processing circuit 118*aa*/120*aa* suitable for use as the nonlinear signal processors 118, 120 in the circuits of FIGS. 5A–5F includes a number of multiplier circuits 224 for generating the signal products 225 within data signal components T4 and T5, and a summing circuit 226 for summing such signal products 225. The respective sliced data signal components 123 are multiplied together, along with corresponding scaling data 223, in accordance with the ISI equation set forth above.

Figure 7B:
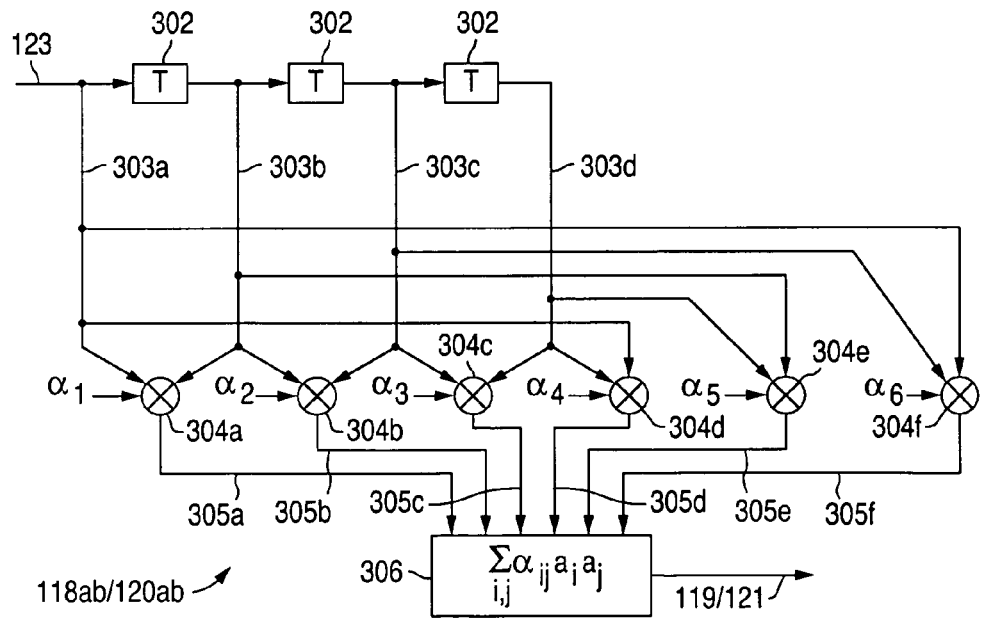

Referring to FIG. 7B, another example of a nonlinear signal processing circuit 118*ab*/120*ab* suitable for use as the nonlinear signal processors 118, 120 in the circuits of FIGS. 5A–5F also includes a number of multiplier circuits 304 for generating signal products 305 by multiplying time-delayed versions 303 of the input signal 301 (delayed by delay elements 302), and a summing circuit 306 for summing such signal products 305.

Figure 8:
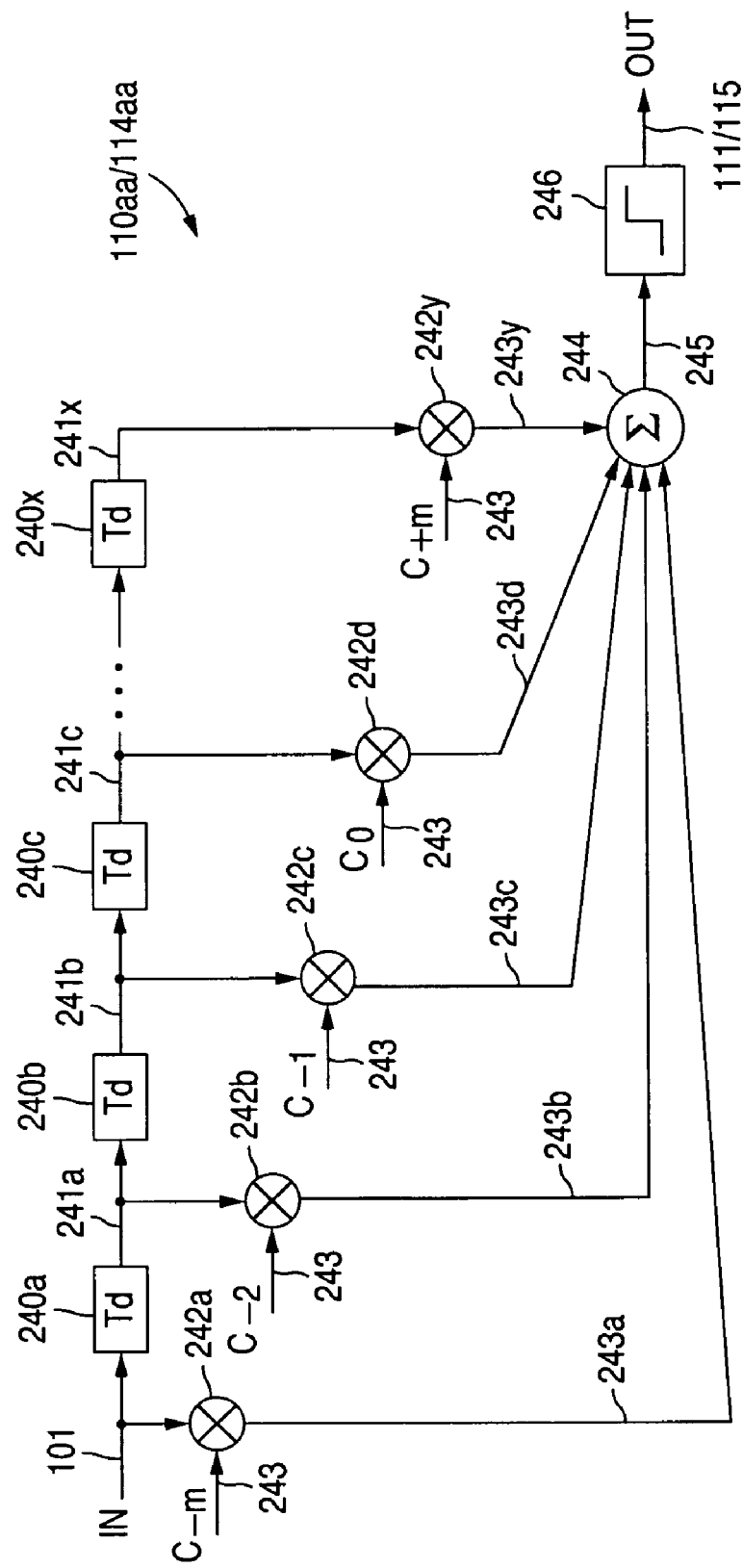
FIG. 8 is a functional block diagram of one example of a feedforward equalizer suitable for use in the circuits of FIGS. 5A–5F.

Referring to FIG. 8, an adaptive equalizer circuit 110*aa*/114*aa* suitable for use as the adaptive equalizers 110, 114 in the circuits of FIGS. 5A–5F can be a conventional feedforward equalizer as shown. Preferably, it is a fractionally-spaced transversal equalizer in which each of the respective time delay intervals Td is less than the period of one data symbol. In accordance with well known techniques, the incoming data signal 101 is progressively delayed by time delay elements 240. The tapped signals 101, 241 are individually multiplied by respective equalizer coefficients 243 within the multipliers 242. The resulting signals 243 are then summed in a summer 244, with the summed signal 245 sliced by a signal slicer 246 to produce the equalized output signal 111/115 (FIGS. 5A–5F).

Figure 9A:
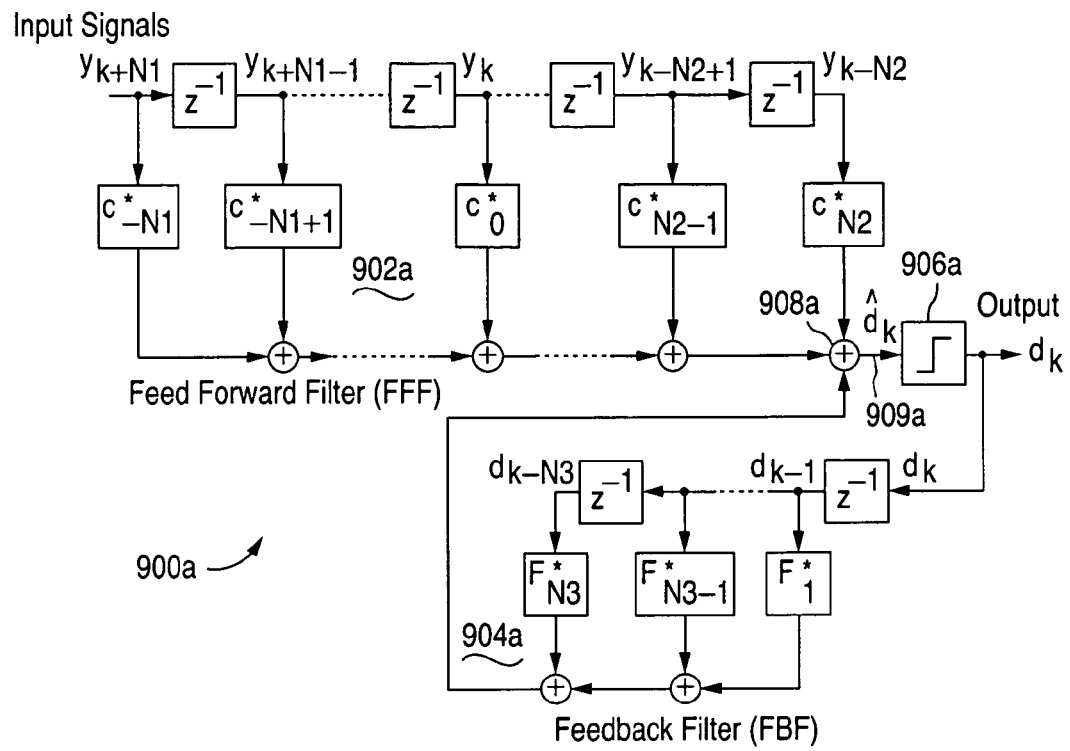
FIGS. 9A and 9B are functional block diagrams of examples of decision feedback equalizers suitable for use in the circuits of FIGS. 5A–5F.

Referring to FIG. 9A, a decision feedback equalizer suitable for use in the circuits of FIGS. 5A–5F can be a conventional direct transversal DFE 900*a* as shown. This DFE 900*a* includes a feed forward filter 902*a* and a feedback filter 904*a*. The feedback filter 904*a* processes the decisions dk from the output of the final signal slicer 906*a*. The coefficients, or gains, $F^*_i$ can be adjusted to cancel ISI on the current symbol based upon past detected symbols. The feed forward filter 902*a* has $N_1+N_2+1$ taps while the feedback filter 904*a* has $N_3$ taps, and the output $\hat{d}_k$ 909*a* of the final signal summer 908*a* can be expressed as follows:

$$\hat{d}_k = \sum_{n=-N_1}^{N_2} c_n^* y_{k-n} + \sum_{i=1}^{N_3} F_i d_{k-i}$$

where
$c^*_n$=tap gains for feed forward filter 902*a*
$y_n$=input signals to feed forward filter 902*a*
$F^*_i$=tap gains for feedback filter 904*a*

$d_i(i<k)$=previous decision made upon detected signal $d_k$

Accordingly, once the output $d_k$ is provided by the output summer 908a of the feed forward filter 902a, the final output $d_k$ is decided. Then, the final output $d_k$ and the previous decisions $d_{k-1}$, $d_{k-2}$, . . . are fed back through the feedback filter 904a, thereby providing the solution for the next decision $\hat{d}_{k+1}$ at the output 909a of the final signal summer 908a in the feed forward filter 902a in accordance with the foregoing equation.

Figure 9B:
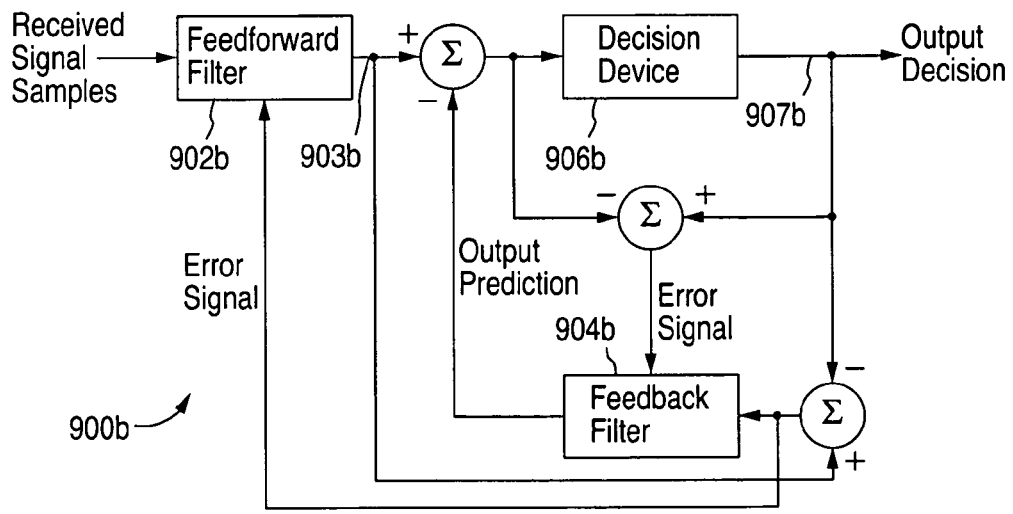

Referring to FIG. 9B, a decision feedback equalizer suitable for use in the circuits of FIGS. 5A–5F can be a conventional predictive DFE 900b as shown. This DFE 900b also includes a feed forward filter 902b and a feedback filter 904b. In this implementation 900b, however, the feedback filter 904b is driven by a signal sequence formed by the difference of the output 907b of the decision device (e.g., signal slicer) 906b and the output 903b of the feed forward filter 902b. Accordingly, the feedback filter 904b in this implementation serves as a noise predictor in that it predicts the noise and residual ISI contained in the output signal 903b of the feed forward filter 902b and subtracts from such noise and residual ISI the output 907b from the decision device 906b (following some feedback delay).

Figure 10A:
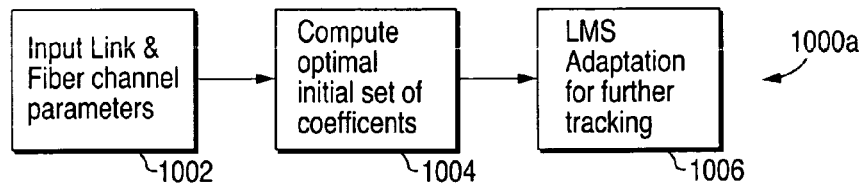
FIGS. 10A–10D illustrate techniques for computing and converging upon values for adaptive coefficients.

Referring to FIG. 10A, in reference to the discussion above concerning the use of adaptive coefficients for scaling the incoming signals, one technique 1000a, which may be described as an input data-aided technique, has three basic steps. The first step 1002 involves the input, or entry, of link and fiber channel parameters used to describe the signal transmission path. In the next step 1004, an initial set of coefficients deemed to be optimal is computed (using Equation M1). Following that in step 1006, a least-mean-square (LMS) adaptation is performed to compute the final set of adaptive coefficients.

Figure 10B:
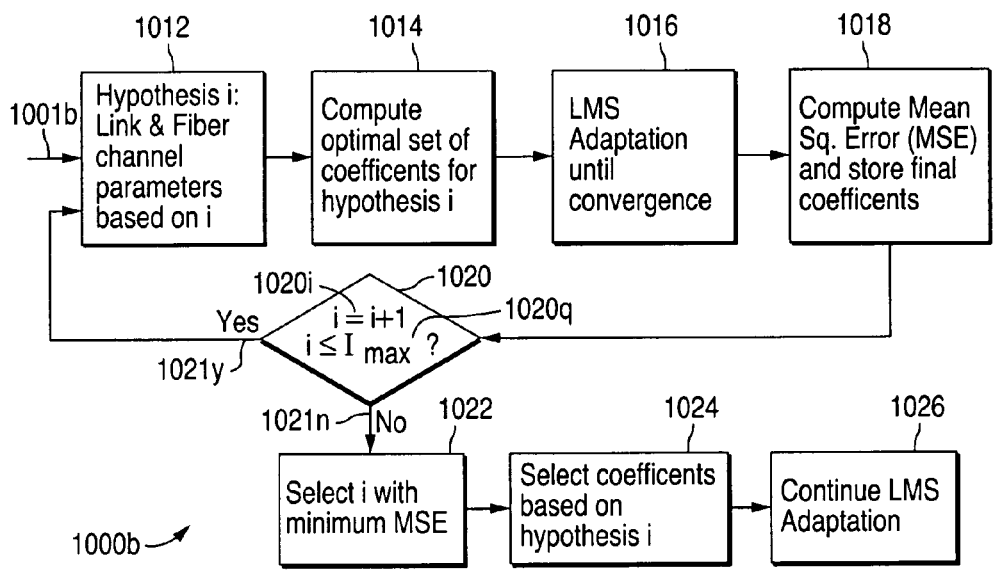

Referring to FIG. 10B, another technique 1000b may be described as a "blind" optimized technique. Starting with an initial hypothesis 1000b concerning the parameters of the signal transmission path, the first step 1012 involves input, or entry of the link and fiber channel parameters based on such hypothesis i.

Following that in step 1014, an optimal set of coefficients for that hypothesis i is computed (using Equation M1). Next, in step 1016, an LMS adaptation is performed until convergence of the values is achieved. Following that in step 1018, the mean-square error (MSE) for such coefficients is computed and stored for later use. Next, in step 1020, the next hypothesis i is selected 1020i and a query is made 1020q as to whether further hypotheses exist. If the answer 1021y is yes, the foregoing steps 1012, 1014, 1016, 1018 are repeated. If the answer 102 In is no, all hypotheses have been tested and, in the next step 1022, the hypothesis i with the minimum MSE is selected. Following this selection, in the next step 1024 the converged values of the adaptive coefficients corresponding to the selected hypothesis i are selected and, in the last step 1026, further LMS adaptation is performed on such selected values.

Figure 10C:
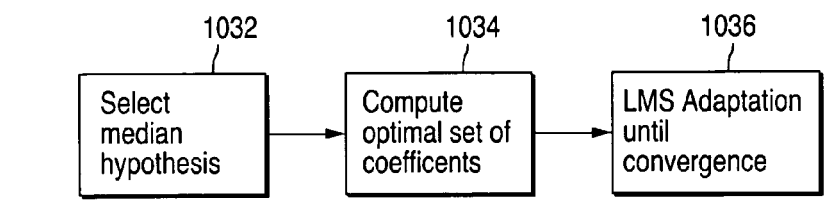

Referring to FIG. 10C, another technique 1000c can be described as a "blind" suboptomized technique. The first step 1032 involves selection of a median hypothesis concerning the parameters of the signal transmission path (e.g., link and fiber channel parameters). In the next step 1034, an optimal set of coefficients is computed (using Equation M1) based on such hypothesis. In the last step 1036, LMS adaptation of such coefficients is performed until their values converge.

Figure 10D:
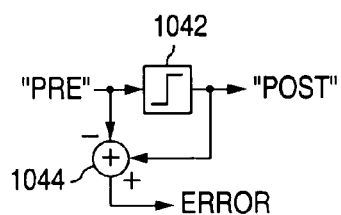

Referring to FIG. 10D, it should be understood that in performing the LMS adaptations of the adaptive coefficients (which is done in accordance with well known conventional techniques) the error parameter that is used is the difference between the output of the final signal slicer and its input. For example, as depicted, for the error associated with a final data output signal, the input "pre" of the final output data slicer 1042 is subtracted in a combiner 1044 from the output "post" of such data slicer 1042. This difference represents the subject error.

Figure 11:
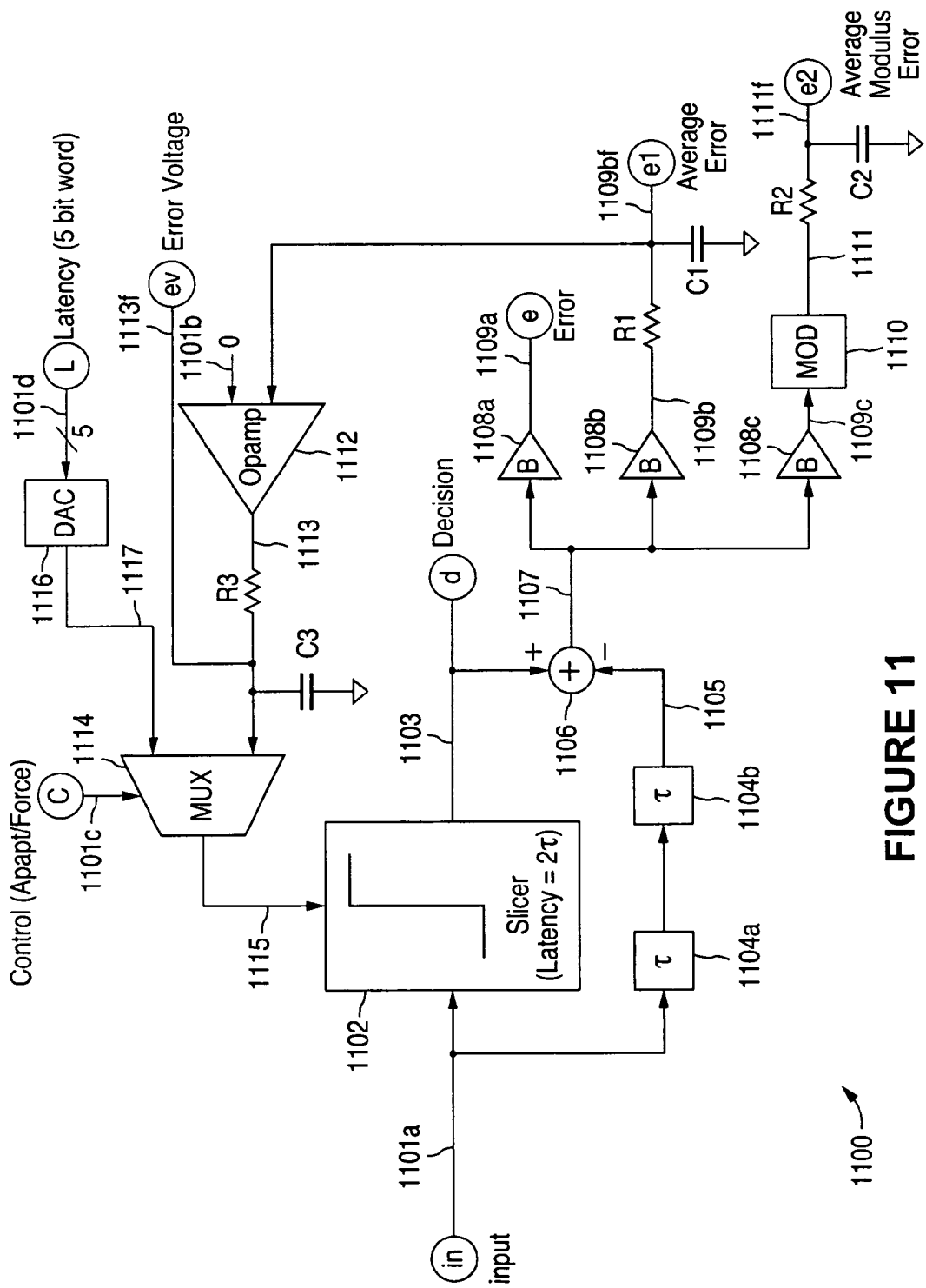
FIG. 11 is a functional block diagram of signal slicer circuitry in which the latency of the data slicer is controllable.

Referring to FIG. 11, the latencies of the data signal slicers discussed above can be controlled using circuitry 1100 substantially as shown. The data input signal 1101a is sliced by the data signal slicer 1102, as well as conveyed and delayed by one or more delay elements 1104. The resulting delayed data signal 1105 is subtracted from the sliced data signal 1103 in a signal combiner 1106. The resultant signal 1107 is buffered by three buffer amplifiers 1108a, 1108b, 1108c.

The first buffered signal 1109a forms the error signal (which may be used in computing the adaptive coefficients, as discussed above). The second buffered signal 1109b is low pass filtered (e.g., low pass filter R1-C1) to produce an average error signal 1109bf. The third buffered signal 1109c is processed by modulus circuitry 1110 with the resultant modulus signal 1111 then low pass filtered (e.g., low pass filter R2-C2) to produce an average modulus error signal 1111f.

The average error signal 1109bf is compared in a differential amplifier 1112 with a reference signal 1101b (e.g., zero volts). The resultant difference signal 1113 is low pass filtered (e.g., low pass filter R3-C3) to produce an error voltage signal 1113f.

Latency control data 1101d (e.g., a five-bit word) is received and converted to an analog signal by a digital-to-analog converter (DAC) 1116. The analog latency control signal 1117 and the error voltage signal 1113f are selectively routed, e.g., via a multiplexer 1114, in accordance with a routing control signal 1101c. The selected signal 1115 (either the latency control signal 1117 or error voltage signal 1113f) is used to control the latency within the data slicer 1102.

Due to the closed loop nature of this circuitry 1100, when the error voltage signal 1113f is selected for use as the control signal 1115 for the latency of the data slicer 1102, such data slicer latency is maintained equal to the cumulative delay of the one or more external delay elements 1104 (in this example, two data symbol periods 2τ. Alternatively, if a specific latency is desired, the latency control signal 1101d can be selected for establishing latency within the data slicer 1102 different from the cumulative delay of the delay elements 1104.

As will be readily understood by those of ordinary skill in the art, the individual circuit elements and functions discussed herein are well known and understood, and can be readily constructed and practiced in numerous ways using either analog or digital implementations as well as combinations of both. For example, analog implementations of the nonlinear signal processing circuit 118a/120a of FIG. 7 or adaptive equalizer circuit 110a/114a of FIG. 8 could use well known Gilbert cell circuitry for the multipliers 224, 242, simple voltage summing circuitry for the adders 226, 244, and passive filters (with substantially constant group delay) for the delay elements 240. Digital implementations of these circuits 118a/120a, 110a/114a could use well known combinations of binary registers and counters for the multipliers 224, 242, combinations of binary logic circuits for the adders 226, 244, and binary shift registers or flip flops for the delay elements 240.

Figure 12A:
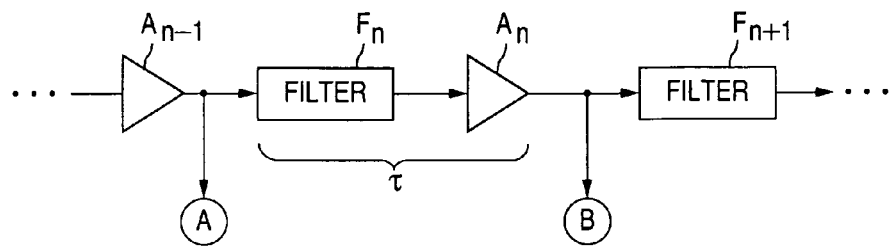
FIGS. 12A–12E are schematic diagrams depicting possible analog implementations for various circuit functions used in crosstalk compensation engines in accordance with embodiments of the presently claimed invention.

Referring to FIG. 12A, for example, analog circuitry suitable for use as the delay elements discussed above can be implemented, in accordance with well known conventional techniques, by a sequence of filters F and amplifiers A connected in series as shown. As is well known, each delay element would include a filter $F_n$ followed by a buffered amplifier $A_n$ This combination of elements $F_n$, $A_n$ will be designed to have a delay such that the signal appearing at point B will appear as the signal at point A but delayed by a time interval τ, e.g., one data symbol period.

Figure 12B:
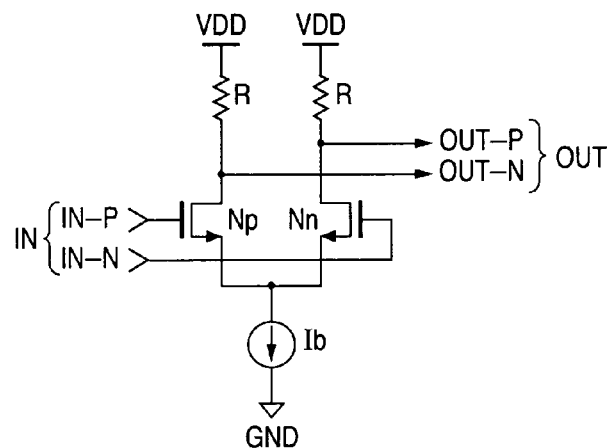

Referring to FIG. 12B, the analog amplifiers A can be implemented as conventional differential amplifiers where the input signal IN and output signal OUT are differential signals. The positive IN-P and negative IN-N phases of the input signal IN are applied to the gate terminals of the differentially connected NMOS transistors Np, Nn which are biased by a tail bias current source Ib. The positive OUT-P and negative OUT-N phases of the output signal OUT appear at the drain terminals of the transistors Nn, Np.

Figure 12C:
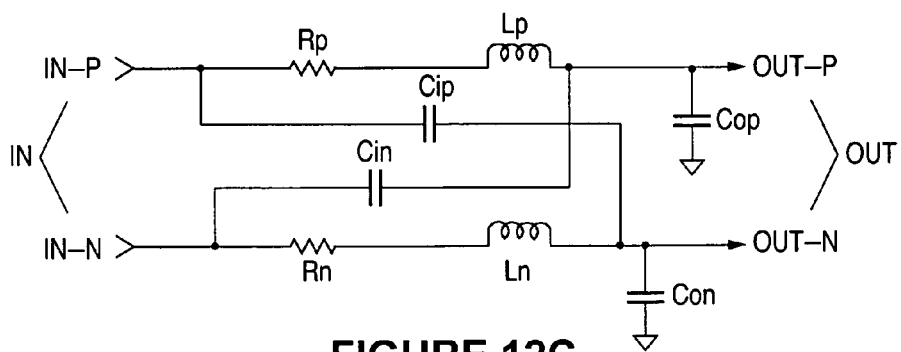

Referring to FIG. 12C, the filters F can be implemented as bridge RLC filters in accordance with well known techniques. The resistive inductive circuits Rp-Lp, Rn-Ln between the corresponding positive signal phase terminals IN-P, OUT-P and negative signal phase terminals IN-N, OUT-N in conjunction with the cross-coupled capacitors Cip, Cin and output shunt capacitors Cop, Con cause the signal appearing at the input IN to appear at the output OUT in a time-delayed but otherwise substantially unchanged form.

Figure 12D:
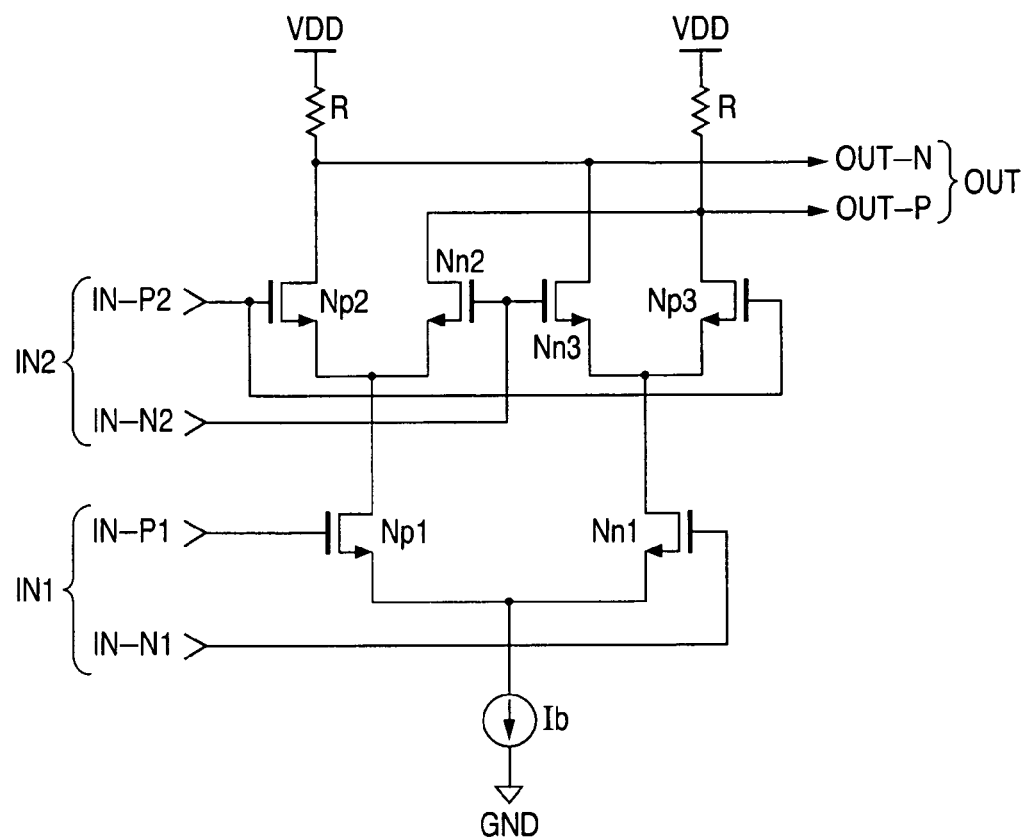

Referring to FIG. 12D, an analog circuit implementation for the multiplier circuitry discussed above can be implemented in accordance with well known techniques using telescopically connected differential amplifiers. The first input signal IN-1 has its positive IN-P1 and negative IN-N1 signal phases applied to the differentially connected NMOS transistors Np1, Nn1 which are biased by a tail bias current source Ib. The resulting drain currents of these transistors Np1, Nn1 serve as tail signal currents for the differentially connected NMOS transistors Np2, Nn2, Np3, Nn3 which are driven by the positive IN-P2 and negative IN-N2 signal phases of the second input signal IN2. The resulting drain currents of these transistors Np2, Nn2, Np3, Nn3 sum in the load resistors R to produce the differential signal phases OUT-P, OUT-N of the output signal OUT.

Figure 12E:
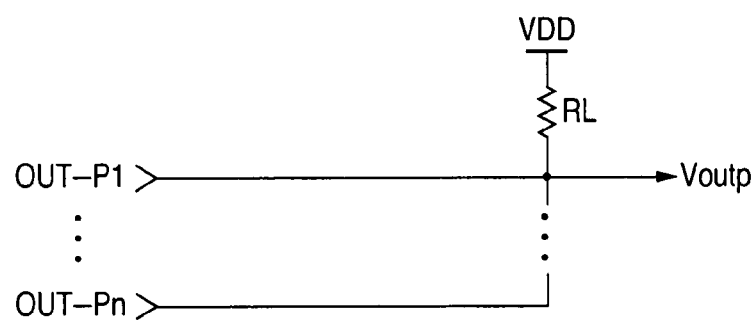

Referring to FIG. 12E, an analog circuit implementation of the signal combining, or summing, circuitry discussed above can be implemented in accordance with well known techniques by connecting the output signal phases of the multiplier circuitry to a common load resistor RL. For example, as shown, for the positive signal phases OUT-P1, . . . , OUT-Pn of a number n of the multiplier output signals are connected together to drive the load resistor RL. As more output signals become active, greater current is drawn through the load resistor RL thereby producing different values for the output voltage Voutp.

As will be further understood, while the present invention has been discussed in the context of implementations using discrete electronic circuitry (preferably in the form of one or more integrated circuit chips), the functions of any part of such circuitry may be implemented using one or more appropriately programmed processors, depending upon the data symbol rates to be processed.

As will be still further understood, while the present invention has been discussed in the context of the detection of signals received via signal transmission media in the form of optical fiber, the compensation principles and techniques discussed herein are also applicable to and useful for the detection of signals received via other forms of dispersive media.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a compensation circuit for reducing intersymbol interference (ISI) products within data signal, comprising:
   an input terminal that conveys an input data signal including a first plurality of ISI products and corresponding to a detected data signal received via a signal transmission medium;
   an output terminal that conveys an output data signal including a second plurality of ISI products which is smaller than said first plurality of ISI products;
   first adaptive equalization circuitry, coupled to said input terminal, that adaptively equalizes said input data signal to provide a first equalized signal;
   equalization and processing circuitry, coupled to said input terminal, that selectively equalizes and processes said input data signal to provide a first processed signal;
   signal combining circuitry, coupled to said first adaptive equalization circuitry, that receives and selectively combines a second processed signal and said first equalized signal to provide a resultant signal; and
   output processing circuitry, coupled to said equalization and processing circuitry, said signal combining circuitry and said output terminal, that receives said first processed signal and in response thereto receives and processes said resultant signal to provide said output data signal and said second processed signal, and includes
      first signal slicing circuitry, coupled between said signal combining circuitry and said output terminal, that receives said first processed signal and in response thereto receives and slices said resultant signal to provide a first sliced signal as said output data signal, and
      nonlinear processing circuitry, coupled between said output terminal and said signal combining circuitry, that nonlinearly processes at least a portion of said first sliced signal to provide said second processed signal.

2. The apparatus of claim 1, wherein said first signal slicing circuitry comprises adaptive signal slicing circuitry.

3. The apparatus of claim 1, wherein said first adaptive equalization circuitry comprises linear equalization circuitry.

4. The apparatus of claim 1, wherein said first adaptive equalization circuitry comprises fractionally-spaced transversal equalization circuitry.

5. The apparatus of claim 1, wherein said equalization and processing circuitry comprises:
   second adaptive equalization circuitry, coupled to said input terminal, that adaptively equalizes said input data signal to provide a second equalized signal; and second signal slicing circuitry, coupled to said second adaptive equalization circuitry, that slices said second equalized signal to provide a second sliced signal as said first processed signal.

6. The apparatus of claim 5, wherein said second adaptive equalization circuitry comprises linear equalization circuitry.

7. The apparatus of claim 5, wherein said second adaptive equalization circuitry comprises fractionally-spaced transversal equalization circuitry.

8. The apparatus of claim 5, wherein said equalization and processing circuitry comprises decision feedback equalization circuitry, coupled to said input terminal, that adaptively equalizes said input data signal to provide said first processed signal.

9. An apparatus including a compensation circuit for reducing intersymbol interference (ISI) products within a data signal, comprising:
an input terminal that conveys an input data signal including a first plurality of ISI products and corresponding to a detected data signal received via a signal transmission medium;
an output terminal that conveys an output data signal including a second plurality of ISI products which is smaller than said first plurality of ISI products;
first adaptive equalization circuitry, coupled to said input terminal, that adaptively equalizes said input data signal to provide a first equalized signal;
equalization and processing circuitry, coupled between said input and output terminals, that selectively equalizes and processes said input data signal and at least a portion of said output data signal to provide first and second processed signals, and includes
second adaptive equalization circuitry, coupled to said input terminal, that adaptively equalizes said input data signal to provide a second equalized signal,
first signal slicing circuitry, coupled to said second adaptive equalization circuitry, that slices said second equalized signal to provide a first sliced signal as said first processed signal, and
nonlinear processing circuitry, coupled between said first signal slicing circuitry and said output terminal, that nonlinearly processes said first sliced signal and said at least a portion of said output data signal to provide said second processed signal;
signal combining circuitry, coupled to said first adaptive equalization circuitry and said equalization and processing circuitry, that receives and selectively combines said second processed signal and said first equalized signal to provide a resultant signal; and
output processing circuitry, coupled to said equalization and processing circuitry, said signal combining circuitry and said output terminal, that receives said first processed signal and in response thereto receives and processes said resultant signal to provide said output data signal.

10. The apparatus of claim 9, wherein said second adaptive equalization circuitry comprises linear equalization circuitry.

11. The apparatus of claim 9, wherein said second adaptive equalization circuitry comprises fractionally-spaced transversal equalization circuitry.

12. The apparatus of claim 9, wherein said first adaptive equalization circuitry comprises linear equalization circuitry.

13. The apparatus of claim 9, wherein said first adaptive equalization circuitry comprises fractionally-spaced transversal equalization circuitry.

14. The apparatus of claim 9, wherein said output processing circuitry comprises second signal slicing circuitry, coupled to said equalization and processing circuitry, said signal combining circuitry and said output terminal, that in response to said first processed signal slices said resultant signal to provide a second sliced signal as said output data signal.

15. An apparatus including a compensation circuit for reducing intersymbol interference (ISI) products within a data signal, comprising:
an input terminal that conveys an input data signal including a first plurality of ISI products and corresponding to a detected data signal received via a signal transmission medium;
an output terminal that conveys an output data signal including a second plurality of ISI products which is smaller than said first plurality of ISI products;
first adaptive equalization circuitry, coupled to said input terminal, that adaptaively equalizes said input data signal to provide a first equalized signal;
equalization and processing circuitry, coupled between said input and output terminals, that selectively equalizes and processes said input data signal and at least a portion of said output data signal to provide first and second processed signals, and includes
decision feedback equalization circuitry, coupled to said input terminal, that adaptively equalizes said input data signal to provide said first processed signal, and
nonlinear processing circuitry, coupled between said decision feedback equalization circuitry and said output terminal, that nonlinearly processes said first processed signal and said at least a portion of said output data signal to provide said second processed signal;
signal combining circuitry, coupled to said first adaptive equalization circuitry and said equalization and processing circuitry, that receives and selectively combines said second processed signal and said first equalized signal to provide a resultant signal; and
output processing circuitry, coupled to said equalization and processing circuitry, said signal combining circuitry and said output terminal, that receives said first processed signal and in response thereto receives and processes said resultant signal to provide said output data signal.

16. The apparatus of claim 15, wherein said first adaptive equalization circuitry comprises linear equalization circuitry.

17. The apparatus of claim 15, wherein said first adaptive equalization circuitry comprises fractionally-spaced transversal equalization circuitry.

18. The apparatus of claim 15, wherein said output processing circuitry comprises signal slicing circuitry, coupled to said equalization and processing circuitry, said signal combining circuitry and said output terminal, that in response to said first processed signal slices said resultant signal to provide a sliced signal as said output data signal.

19. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

equalization and processing circuitry, coupled between said input and output terminals, that selectively equalizes and processes said input data signal and at least a portion of said output data signal to provide first and second processed signals;

signal combining circuitry, coupled to said first adaptive equalization circuitry and said equalization and processing circuitry, that receives and selectively combines said second processed signal and said first equalized signal to provide a resultant signal; and output processing circuitry, coupled to said equalization and processing circuitry, said signal combining circuitry and said output terminal, that receives said first processed signal and in response thereto receives and processes said resultant signal to provide said output data signal, and includes signal slicing circuitry, coupled to said equalization and processing circuitry, said signal combining circuitry and said output terminal, that in response to said first processed signal slices said resultant signal to provide a sliced signal as said output data signal.

20. The apparatus of claim 19, wherein said signal slicing circuitry comprises adaptive signal slicing circuitry.

21. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

equalization and processing circuitry, coupled to said input terminal, that selectively equalizes and processes said input data signal to provide a first processed signal;

signal combining circuitry, coupled to said input terminal, that receives and selectively combines a second processed signal and said input data signal to provide a resultant signal; and output processing circuitry, coupled to said equalization and processing circuitry, said signal combining circuitry and said output terminal, that receives said first processed signal and in response thereto receives and processes said resultant signal to provide said output data signal and said second processed signal, and includes first signal slicing circuitry, coupled to said equalization and processing circuitry, said signal combining circuitry and said output terminal, that receives said first processed signal and in response thereto receives and slices said resultant signal to provide a first sliced signal as said output data signal, and nonlinear processing circuitry, coupled between said output terminal and said signal combining circuitry, that nonlinearly processes at least a portion of said first sliced signal to provide said second processed signal.

22. The apparatus of claim 21, wherein said first signal slicing circuitry comprises adaptive signal slicing circuitry.

23. The apparatus of claim 21, wherein said equalization and processing circuitry comprises:

adaptive equalization circuitry, coupled to said input terminal, that adaptively equalizes said input data signal to provide an equalized signal; and second signal slicing circuitry, coupled to said adaptive equalization circuitry, that slices said equalized signal to provide a second sliced signal as said first processed signal.

24. The apparatus of claim 23, wherein said adaptive equalization circuitry comprises linear equalization circuitry.

25. The apparatus of claim 23, wherein said adaptive equalization circuitry comprises fractionally-spaced transversal equalization circuitry.

26. The apparatus of claim 21, wherein said equalization and processing circuitry comprises decision feedback equalization circuitry, coupled to said input terminal, that adaptively equalizes said input data signal to provide said first processed signal.

27. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

equalization and processing circuitry, coupled between said input and output terminals, that selectively equalizes and processes said input data signal and at least a portion of said output data signal to provide first and second processed signals, and includes adaptive equalization circuitry, coupled to said input terminal, that adaptively equalizes said input data signal to provide an equalized signal, first signal slicing circuitry, coupled to said adaptive equalization circuitry, that slices said equalized signal to provide a first sliced signal as said first processed signal, and nonlinear processing circuitry, coupled between said first signal slicing circuitry and said output terminal, that nonlinearly processes said first sliced signal and said at least a portion of said output data signal to provide said second processed signal;

signal combining circuitry, coupled to said input terminal and said equalization and processing circuitry, that receives and selectively combines said second processed signal and said input data signal to provide a resultant signal; and output processing circuitry, coupled to equalization and processing circuitry, said signal combining circuitry and said output terminal, that receives said first processed signal and in response thereto receives and processes said resultant signal to provide said output data signal.

28. The apparatus of claim 27, wherein said adaptive equalization circuitry comprises linear equalization circuitry.

29. The apparatus of claim 27, wherein said adaptive equalization circuitry comprises fractionally-spaced transversal equalization circuitry.

30. The apparatus of claim 27, wherein said output processing circuitry comprises second signal slicing circuitry, coupled between said signal combining circuitry and said output terminal, that slices said resultant signal to provide a second sliced signal as said output data signal.

31. An apparatus including a compensation circuit for reducing intersymbol interference (ISI) products within a data signal, comprising:
an input terminal that conveys an input data signal including first plurality of ISI products and corresponding to a detected data signal received via a signal transmission medium;
an output terminal that conveys an output data signal including a second plurality of ISI products which is smaller than said first plurality of ISI products;
equalization and processing circuitry, coupled between said input and output terminals, that selectively equalizes and processes said input data signal and at least a portion of said output data signal to provide first and second processed signals, and includes
decision feedback equalization circuitry, coupled to said input terminal, that adaptively equalizes said input data signal to provide said first processed signal, and
nonlinear processing circuitry, coupled between said decision feedback equalization circuitry and said output terminal, that nonlinearly processes said first processed signal and said at least a portion of said output data signal to provide said second processed signal;
signal combining circuitry, coupled to said input terminal and said equalization and processing circuitry, that receives and selectively combines said second processed signal and said input data signal to provide a resultant signal; and
output processing circuitry, coupled to equalization and processing circuitry, said signal combining circuitry and said output terminal, that receives said first processed signal and in response thereto receives and processes said resultant signal to provide said output data signal.

32. The apparatus of claim 31, wherein said output processing circuitry comprises signal slicing circuitry, coupled between said signal combining circuitry and said output terminal, that slices said resultant signal to provide a sliced signal as said output data signal.

33. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying an output including a second plurality of ISI products which is smaller than said first plurality of ISI products;
first adaptive equalizer means for adaptively equalizing said input data signal to provide a first equalized signal;
equalizer and processor means for selectively equalizing and processing said input data signal to provide a first processed signal;
signal combiner means for receiving and selectively combining a second processed signal and said first equalized signal to provide a resultant signal; and
output processor means for receiving said first processed signal and in response thereto receiving and processing said resultant signal to provide said output data signal and said second processed signal, and including
signal slicer means for slicing said resultant signal in response to said first processed signal to provide a sliced signal as said output data signal, and
nonlinear processor means for nonlinearly processing at least a portion of said sliced signal to provide said second processed signal.

34. The apparatus of claim 33, wherein said equalizer and processor means comprises:
second adaptive equalizer means for adaptively equalizing said input data signal to provide a second equalized signal; and
signal slicer means for slicing said second equalized signal to provide a sliced signal as said first processed signal.

35. The apparatus of claim 33, wherein said equalizer and processor means comprises decision feedback equalizer means for adaptively equalizing said input data signal to provide said first processed signal.

36. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying an output data signal including a second plurality of ISI products which is smaller than said first plurality of ISI products;
first adaptive equalizer means for adaptively equalizing said input data signal to provide a first equalized signal;
equalizer and processor means for selectively equalizing and processing said input data signal and at least a portion of said output data signal to provide first and second processed signals, and including
second adaptive equalizer means for adaptively equalizing said input data signal to provide a second equalized signal,
signal slicer means for slicing said second equalized signal to provide a sliced signal as said first processed signal, and
nonlinear processor means for nonlinearly processing said sliced signal and said at least a portion of said output data signal to provide said second processed signal;
signal combiner means for receiving and selectively combining said second processed signal and said first equalized signal to provide a resultant signal; and
output processor means for receiving said first processed signal and in response thereto receiving and processing said resultant signal to provide said output data signal.

37. An apparatus including a compensation circuit for reducing intersymbol interference ISI products within a data signal, comprising:
input means for conveying an input data signal including a first plurality of ISI products and corresponding to a detected data signal received via a signal transmission medium;
output means for conveying an output data signal including a second plurality of ISI products which is smaller than said first plurality of ISI products;
first adaptive equalizer means for adaptively equalizing said input data signal to provide a first equalized signal;

equalizer and processor means for selectively equalizing and processing said input data signal and at least a portion of said data signal to provide first and second processed signals, and including
  decision feedback equalizer means for adaptively equalizing said input data signal to provide said first processed signal, and
  nonlinear processor means for nonlinearly processing said first processed signal and said at least a portion of said output data signal to provide said second processed signal;
signal combiner means for receiving and selectively combining said second processed signal and said first equalized signal to provide a resultant signal; and
output processor means for receiving said first processed signal and in response thereto receiving and processing said resultant signal to provide said output data signal.

38. An apparatus including a compensation circuit for reducing intersymbol interference (ISI) products within a data signal, comprising:
input means for conveying an input signal including a first plurality of ISI products and corresponding to a detected data signal received via a signal transmission medium;
output means for conveying an output data signal including a second plurality of ISI products which is smaller than said first plurality of ISI products;
first adaptive equalizer means for adaptively equalizing said input data signal to provide a first equalized signal;
equalizer and processor means for selectively equalizing and processing said input data signal and at least a portion of said output data signal to provide first and second processed signals;
signal combiner means for receiving and selectively combining said second processed signal and said first equalized signal to provide a resultant signal; and
output processor means for receiving said first processed signal and in response thereto receiving and processing said resultant signal to provide said output data signal, and including signal slicer means for slicing said resultant signal in response to said first processed signal to provide a sliced signal as said output data signal.

39. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying data signal including a second plurality of ISI products which is smaller than said first plurality of ISI products;
equalizer and processor means for selectively equalizing and processing said input data signal to provide a first processed signal;
signal combiner means for receiving and selectively combining a second processed signal and said input data signal to provide a resultant signal; and
output processor means for receiving said first processed signal and in response thereto receiving and processing said resultant signal to provide said output data signal and said second processed signal, and including
  first signal slicer means for slicing said resultant signal in response to said first processed signal to provide a first sliced signal as said output data signal, and
  nonlinear processor means for nonlinearly processing at least a portion of said first sliced signal to provide said second processed signal.

40. The apparatus of claim 39, wherein said equalizer and processor means comprises:
adaptive equalizer means for adaptively equalizing said input data signal to provide an equalized signal; and
second signal slicer means for slicing said equalized signal to provide a second sliced signal as said first processed signal.

41. The apparatus of claim 39, wherein said equalizer and processor means comprises decision feedback equalizer means for adaptively equalizing said input data signal to provide said processed signal.

42. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying an output data signal including a second plurality of ISI products which is smaller than said first plurality of ISI products;
equalizer and processor means for selectively equalizing and processing said input data signal and at least a portion of said output data signal to provide first and second processed signals, and including
  adaptive equalizer means for adaptively equalizing said input data signal to provide an equalized signal,
  signal slicer means for slicing said equalized signal to provide a sliced signal as said first processed signal, and
  nonlinear processor means for nonlinearly processing said sliced signal and said at least a portion of said output data signal to provide said second processed signal;
signal combiner means for receiving and selectively combining said second processed signal and said input data signal to provide a resultant signal; and
output processor means for receiving said first processed signal and in response thereto receiving and processing said resultant signal to provide said output data signal.

43. An apparatus including a compensation circuit for reducing intersymbol interference (ISI) products within a data signal, comprising:
input means for conveying an input data signal including a first plurality of ISI products corresponding to a detected data signal received via a signal transmission medium;
output means for conveying an output data signal including a second plurality of ISI products which is smaller than said first plurality of ISI products;
equalizer and processor means for selectively equalizing and processing said input data signal and at least a portion of said output data signal to provide first and second processed signals, and including
  decision feedback equalizer means for adaptively equalizing said input data signal to provide said first processed signal, and
  nonlinear processor means for nonlinearly processing said first processed signal and said at least a portion of said output data signal to provide said second processed signal;
signal combiner means for receiving and selectively combining said second processed signal and said input data signal to provide a resultant signal; and output processor means for said first processed signal and in response thereto receiving and processing said resultant signal to provide said output data signal.

44. A compensation method for reducing intersymbol interference (ISI) products within a data signal, comprising:
receiving an input data signal including a first plurality of ISI products and corresponding to a detected data signal received via a signal transmission medium;
adaptively equalizing said input data signal to provide a first equalized signal;
selectively equalizing and processing said input data signal to provide a first processed signal;
selectively combining a second processed signal and said first equalized signal to provide a resultant signal; and
processing said resultant signal in response to said first processed signal to provide said second processed signal and an output data signal including a second plurality of ISI products which is smaller than said first plurality of ISI products by
slicing said resultant signal in response to said first processed signal to provide a first sliced signal as said output data signal, and
nonlinearly processing at least a portion of said first sliced signal to provide said second processed signal.

45. The method of claim 44, wherein said selectively equalizing and processing said input data signal to provide said first processed signal comprises:
adaptively equalizing said input data signal to provide a second equalized signal; and
slicing said second equalized signal to provide a second sliced signal as said first processed signal.

46. A compensation method for reducing intersymbol interference (ISI) products within a data signal comprising:
receiving an input data signal including a first plurality of ISI products and corresponding to a detected data signal received via a signal transmission medium;
adaptively equalizing said input data signal to provide a first equalized signal;
selectively equalizing and processing said input data signal and at least a portion of said output data signal to provide first and second processed signals by
adaptively equalizing said input data signal to provide a second equalized signal,
slicing said second equalized signal to provide a sliced signal as said first processed signal, and
nonlinearly processing said sliced signal and said at least a portion of said output data signal to provide said second processed signal;
selectively combining said second processed signal and said first equalized signal to provide a resultant signal; and
processing said resultant signal in response to said first processed signal to provide an output data signal including a second plurality of ISI products which is smaller than said first plurality of ISI products.

47. A compensation method for reducing intersymbol interference (ISI) products within a data signal comprising:
receiving an input data signal in including a first plurality of ISI products and corresponding to a detected data signal received via a signal transmission medium;
adaptively equalizing said input data signal to provide a first equalized signal;
selectively equalizing and processing said input data signal and at least a portion of said output data signal to provide first and second processed signals by
adaptively equalizing said input data signal to provide said first processed signal, and
nonlinearly processing said first processed signal and said at least a portion of said output data signal to provide said second processed signal;
selectively combining said second processed signal and said first equalized signal to provide a resultant signal; and
processing said resultant signal in response to said first processed signal to provide an output data signal including a second plurality of ISI products which is smaller than said first plurality of ISI products.

48. A compensation method for reducing intersymbol interferenee (ISI) products within a data signal; and
receiving an input data signal including a first plurality of ISI products and corresponding to a detected data signal received via a signal transmission medium;
adaptively equalizing said input data signal to provide a first equalized signal;
selectively equalizing and processing said input data signal and at least a portion of said output data signal to provide first and second processed signals;
selectively combining said second processed signal and said first equalized signal to provide a resultant signal; and
processing said resultant signal in response to said first processed signal to provide an output data signal including a second plurality of ISI products which is smaller than said first plurality of ISI products by slicing said resultant signal in response to said first processed signal to provide a sliced signal as said output data signal.

49. A compensation method for reducing intersymbol interference (ISI) products within a data signal comprising:
receiving an input data signal including a first plurality of ISI products and corresponding to a detected data signal received via a signal transmission medium;
selectively equalizing and processing said input data signal to provide a first processed signal;
selectively combining a second processed signal and said input data signal to provide a resultant signal; and
processing said resultant signal in response to said first processed signal to provide said second processed signal and an output data signal including a second plurality of ISI products which is smaller than said first plurality of ISI products by
slicing said resultant signal in response to said first processed signal to provide a first sliced signal as said output data signal, and
nonlinearly processing at least a portion of said first sliced signal to provide said second processed signal.

50. The method of claim 49, wherein said selectively equalizing and processing said input data signal to provide said first processed signal comprises:
adaptively equalizing said input data signal to provide an equalized signal; and
slicing said equalized signal to provide a second sliced signal as said first processed signal.

51. A compensation method for reducing intersymbol interference (ISI) products within a data signal, comprising:
receiving an input data signal including a first plurality of ISI products and corresponding to a detected data signal received via a signal transmission medium;
selectively equalizing and processing said input data signal and at least a portion of said output data signal to provide first and second processed signals by
adaptively equalizing said input data signal to provide an equalized signal, slicing said equalized signal to provide a sliced signal as said first processed signal, and nonlinearly processing said sliced signal and said at least a portion of said output data signal to provide said second processed signal;

selectively combining said second processed signal and said input data signal to provide a resultant signal; and processing said resultant signal in response to said first processed signal to provide an output data signal including a second plurality of ISI products which is smaller than said first plurality of ISI products.

52. A compensation method for reducing intersymbol interference (ISI) products within a data signal, comprising:

receiving an input data signal including a first plurality of ISI products and corresponding to a detected data signal received via a signal transmission medium;

selectively equalizing and processing said input data signal and at least a portion of said output data signal to provide first and second processed signals by adaptively equalizing said input data signal to provide said first processed signal, and nonlinearly processing said first processed signal and said at least a portion of said output data signal to provide said second processed signal;

selectively combining said second processed signal and said input data signal to provide a resultant signal; and processing said resultant signal in response to said first processed signal to provide an output data signal including a second plurality of ISI products which is smaller than said first plurality of ISI products.

53. A interference (ISI) products within a data signal, comprising:

receiving an input data signal including a first plurality of ISI products and corresponding to a detected data signal received via a signal transmission medium;

selectively equalizing and processing said input data signal and at least a portion of said output data signal to provide first and second processed signals;

selectively combining said second processed signal and said input data signal to provide a resultant signal; and processing said resultant signal in response to said first processed signal to provide an output data signal including a second plurality of ISI products which is smaller than said first plurality of ISI products by slicing said resultant signal to provide a sliced signal as said output data signal.

54. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

adaptive equalization circuitry, coupled to said input terminal, that adaptively equalizes said input data signal to provide an equalized signal;

first signal combining circuitry, coupled to said adaptive equalization circuitry, that receives and selectively combines a feedback signal and said equalized signal to provide an intermediate signal;

first signal slicing circuitry, coupled to said first signal combining circuitry, that slices said intermediate signal to provide a first sliced signal;

first intermediate processing circuitry, coupled to said first signal slicing circuitry and said first signal combining circuitry, that processes at least one of said first sliced signal and at least a portion of said output data signal to provide said feedback signal;

second intermediate processing circuitry, coupled between said first signal slicing circuitry and said output terminal, that processes said first sliced signal and another portion of said output data signal to provide a first processed signal;

second signal combining circuitry, coupled to said input terminal and said second intermediate processing circuitry, that receives and selectively combines said first processed signal, a second processed signal and said input data signal to provide a resultant signal; and output processing circuitry, coupled between said second signal combining circuitry and said output terminal, that processes said resultant signal to provide said output data signal and said second processed signal.

55. The apparatus of claim 54, wherein said adaptive equalization circuitry comprises linear equalization circuitry.

56. The apparatus of claim 54, wherein said first intermediate processing circuitry comprises decision feedback equalization circuitry.

57. The apparatus of claim 54, wherein said output processing circuitry comprises:

second signal slicing circuitry, coupled between said second signal combining circuitry and said output terminal, that slices said resultant signal to provide a second sliced signal as said output data signal; and further processing circuitry, coupled between said output terminal and said second signal combining circuitry, that processes at least a portion of said second sliced signal to provide said second processed signal.

58. The apparatus of claim 57, wherein said second signal slicing circuitry comprises adaptive signal slicing circuitry.

59. The apparatus of claim 58, wherein said adaptive equalization circuitry comprises linear equalization circuitry.

60. The apparatus of claim 58, wherein said first intermediate processing circuitry comprises decision feedback equalization circuitry.

61. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

adaptive equalization circuitry, coupled to said input terminal, that adaptively equalizes said input data signal to provide an equalized signal;

first signal combining circuitry, coupled to said adaptive equalization circuitry, that receives and selectively combines a feedback signal and said equalized signal to provide an intermediate signal;

first signal slicing circuitry, coupled to said first signal combining circuitry, that slices said intermediate signal to provide a first sliced signal;

first intermediate processing circuitry, coupled to said first signal slicing circuitry and said first signal combining circuitry, that processes at least one of said first sliced signal and at least a portion of said output data signal to provide said feedback signal;

second intermediate processing circuitry, coupled between said first signal slicing circuitry and said output terminal, that processes said first sliced signal and another portion of said output data signal to provide a processed signal;

second signal combining circuitry, coupled to said input terminal and said adaptive equalization circuitry, that receives and selectively combines said processed signal and said input data signal to provide a resultant signal; and output processing circuitry, coupled between said second signal combining circuitry and said output terminal, that processes said resultant signal to provide said output data signal.

62. The apparatus of claim 61, wherein said adaptive equalization circuitry comprises linear equalization circuitry.

63. The apparatus of claim 61, wherein said first intermediate processing circuitry comprises decision feedback equalization circuitry.

64. The apparatus of claim 61, wherein said output processing circuitry comprises second signal slicing circuitry, coupled between said second signal combining circuitry and said output terminal, that slices said resultant signal to provide a second sliced signal as said output data signal.

65. The apparatus of claim 64, wherein said second signal slicing circuitry comprises adaptive signal slicing circuitry.

66. The apparatus of claim 65, wherein said adaptive equalization circuitry comprises linear equalization circuitry.

67. The apparatus of claim 65, wherein said first intermediate processing circuitry comprises decision feedback equalization circuitry.

68. An apparatus including a compensation circuit for reducing intersymbol interference (ISI) products within a data signal, comprising:

an input terminal that conveys an input data signal including a first plurality of ISI products and corresponding to a detected data signal received via a signal transmission medium;

an output terminal that conveys an output data signal including a second plurality of ISI products which is smaller than said first plurality of ISI products;

first adaptive equalization circuitry, coupled to said input terminal, that adaptively equalizes said input data signal to provide a first equalized signal;

second adaptive equalization circuitry, coupled to said input terminal, that adaptively equalizes said input data signal to provide a second equalized signal;

first signal combining circuitry, coupled to said second adaptive equalization circuitry, that receives and selectively combines a feedback signal and said second equalized signal to provide an intermediate signal;

first signal slicing circuitry, coupled to said first signal combining circuitry, that slices said intermediate signal to provide a first sliced signal;

first intermediate processing circuitry, coupled to said first signal slicing circuitry and said first signal combining circuitry, that processes at least one of said first sliced signal and at least a portion of said output data signal to provide said feedback signal;

second intermediate processing circuitry, coupled between said first signal slicing circuitry and said output terminal, that processes said first sliced signal and another portion of said output data signal to provide a first processed signal;

second signal combining circuitry, coupled to said first adaptive equalization circuitry and said second adaptive equalization circuitry, that receives and selectively combines said first processed signal, a second processed signal and said first equalized signal to provide a resultant signal; and output processing circuitry, coupled between said second signal combining circuitry and said output terminal, that processes said resultant signal to provide said output data signal and said second processed signal.

69. The apparatus of claim 68, wherein said first adaptive equalization circuitry comprises linear equalization circuitry.

70. The apparatus of claim 68, wherein said second adaptive equalization circuitry comprises linear equalization circuitry.

71. The apparatus of claim 68, wherein said first intermediate processing circuitry comprises decision feedback equalization circuitry.

72. The apparatus of claim 68, wherein said output processing circuitry comprises:

second signal slicing circuitry, coupled between said second signal combining circuitry and said output terminal, that slices said resultant signal to provide a second sliced signal as said output data signal; and further processing circuitry, coupled between said output terminal and said second signal combining circuitry, that processes at least a portion of said second sliced signal to provide said second processed signal.

73. The apparatus of claim 72, wherein said second signal slicing circuitry comprises adaptive signal slicing circuitry.

74. The apparatus of claim 73, wherein said first adaptive equalization circuitry comprises linear equalization circuitry.

75. The apparatus of claim 73, wherein said second adaptive equalization circuitry comprises linear equalization circuitry.

76. The apparatus of claim 73, wherein said first intermediate processing circuitry comprises decision feedback equalization circuitry.

77. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

adaptive equalizer means for adaptively equalizing said input data signal to provide an equalized signal;

first signal combiner means for receiving and selectively combining a feedback signal and said equalized signal to provide an intermediate signal;

first signal slicer means for slicing said intermediate signal to provide a first sliced signal;

first intermediate processor means for processing at least one of said first sliced signal and at least a portion of said output data signal to provide said feedback signal;

second intermediate processor means for processing said sliced signal and another portion of said output data signal to provide a first processed signal;

second signal combiner means for receiving and selectively combining said first processed signal, a second processed signal and said input data signal to provide a resultant signal; and output processor means for processing said resultant signal to provide said output data signal and said second processed signal.

78. The apparatus of claim 77, wherein said output processor means comprises:

second signal slicer means for slicing said resultant signal to provide a second sliced signal as said output data signal; and further processor means for processing at least a portion of said second sliced signal to provide said second processed signal.

79. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

adaptive equalizer means for adaptively equalizing said input data signal to provide an equalized signal;

first signal combiner means for receiving and selectively combining a feedback signal and said equalized signal to provide an intermediate signal;

first signal slicer means for slicing said intermediate signal to provide a first sliced signal;

first intermediate processor means for processing at least one of said first sliced signal and at least a portion of said output data signal to provide said feedback signal;

second intermediate processor means for processing said sliced signal and another portion of said output data signal to provide a processed signal;

second signal combiner means for receiving and selectively combining said processed signal and said input data signal to provide a resultant signal; and output processor means for processing said resultant signal to provide said output data signal.

80. The apparatus of claim 79, wherein said output processor means comprises second signal slicer means for slicing said resultant signal to provide a second sliced signal as said output data signal.

81. An apparatus including a compensation circuit for reducing intersymbol interference (ISI) products within a data signal, comprising:

input means for conveying an input data signal including a first plurality of ISI products and corresponding to a detected data signal received via a signal transmission medium;

output means for conveying an output data signal including a second plurality of ISI products which is smaller than said first plurality of ISI products;

first adaptive equalizer means for adaptively equalizing said input data signal to provide a first equalized signal;

second adaptive equalizer means for adaptively equalizing said input data signal to provide an equalized signal;

first signal combiner means for receiving and selectively combining a feedback signal and said equalized signal to provide an intermediate signal;

first signal slicer means for slicing said intermediate signal to provide a first sliced signal;

first intermediate processor means for processing at least one of said first sliced signal and at least a portion of said output data signal to provide said feedback signal;

second intermediate processor means for processing said sliced signal and another portion of said output data signal to provide a first processed signal;

signal combiner means for receiving and selectively combining said first processed signal, a second processed signal and said first equalized signal to provide a resultant signal; and output processor means for processing said resultant signal to provide said output data signal and said second processed signal.

82. The apparatus of claim 81, wherein said output processor means comprises:

second signal slicer means for slicing said resultant signal to provide a second sliced signal as said output data signal; and further processor means for processing at least a portion of said sliced signal to provide said second processed signal.

83. A method for reducing intersymbol interference (ISI) products within a data signal, comprising:

receiving an input data signal that includes a first plurality of ISI products and corresponds to a detected data signal received via a signal transmission medium;

adaptively equalizing said input data signal to provide an equalized signal;

selectively combining a feedback signal and said equalized signal to provide an intermediate signal;

slicing said intermediate signal to provide a first sliced signal;

processing at least one of said first sliced signal and at least a portion of said output data signal to provide said feedback signal;

processing said first sliced signal and another portion of said output data signal to provide a first processed signal;

selectively combining said first processed signal, a second processed signal and said input data signal to provide a resultant signal; and processing said resultant signal to provide said second processed signal and an output data signal that includes a second plurality of ISI products which is smaller than said first plurality of ISI products.

84. The method of claim 83, wherein said adaptively equalizing said input data signal to provide an equalized signal comprises linearly equalizing said input data signal.

85. The method of claim 83, wherein said processing said resultant signal to provide said second processed signal and an output data signal that includes a second plurality of ISI products which is smaller than said first plurality of ISI products comprises:

slicing said resultant signal to provide a second sliced signal as said output data signal; and processing at least a portion of said second sliced signal to provide said second processed signal.

86. The method of claim 85, wherein said slicing said resultant signal to provide a second sliced signal as said output data signal comprises adaptively slicing said resultant signal.

87. The method of claim 86, wherein said adaptively equalizing said input data signal to provide an equalized signal comprises linearly equalizing said input data signal.

88. A method for reducing intersymbol interference (ISI) products within a data signal, comprising:
- receiving an input data signal that includes a first plurality of ISI products and corresponds to a detected data signal received via a signal transmission medium;
- adaptively equalizing said input data signal to provide an equalized signal;
- selectively combining a feedback signal and said equalized signal to provide an intermediate signal;
- slicing said intermediate signal to provide a first sliced signal;
- processing at least one of said first sliced signal and at least a portion of said output data signal to provide said feedback signal;
- processing said first sliced signal and another portion of said output data signal to provide a processed signal;
- selectively combining said processed signal and said input data signal to provide a resultant signal; and
- processing said resultant signal to provide an output data signal that includes a second plurality of ISI products which is smaller than said first plurality of ISI products.

89. The method of claim 88, wherein said adaptively equalizing said input data signal to provide an equalized signal comprises linearly equalizing said input data signal.

90. The method of claim 88, wherein said processing said resultant signal to provide an output data signal that includes a second plurality of ISI products which is smaller than said first plurality of ISI products comprises slicing said resultant signal to provide a second sliced signal as said output data signal.

91. The method of claim 90, wherein said slicing said resultant signal to provide a second sliced signal as said output data signal comprises adaptively slicing said resultant signal.

92. The method of claim 91, wherein said adaptively equalizing said input data signal to provide an equalized signal comprises linearly equalizing said input data signal.

93. A method for reducing intersymbol interference (ISI) products within a data signal, comprising:
- receiving an input data signal that includes a first plurality of ISI products and corresponds to a detected data signal received via a signal transmission medium;
- adaptively equalizing said input data signal to provide a first equalized signal;
- adaptively equalizing said input data signal to provide a second equalized signal;
- selectively combining a feedback signal and said second equalized signal to provide an intermediate signal;
- slicing said intermediate signal to provide a first sliced signal;
- processing at least one of said first sliced signal and at least a portion of said output data signal to provide said feedback signal;
- processing said first sliced signal and another portion of said output data signal to provide a first processed signal;
- selectively combining said first processed signal, a second processed signal and said first equalized signal to provide a resultant signal; and
- processing said resultant signal to provide said second processed signal and an output data signal that includes a second plurality of ISI products which is smaller than said first plurality of ISI products.

94. The method of claim 93, wherein said adaptively equalizing said input data signal to provide a first equalized signal comprises linearly equalizing said input data signal.

95. The method of claim 93, wherein said adaptively equalizing said input data signal to provide a second equalized signal comprises linearly equalizing said input data signal.

96. The method of claim 93, wherein said processing said resultant signal to provide said second processed signal and an output data signal that includes a second plurality of ISI products which is smaller than said first plurality of ISI products comprises:
- slicing said resultant signal to provide a second sliced signal as said output data signal; and
- processing at least a portion of said second sliced signal to provide said second processed signal.

97. The method of claim 96, wherein said slicing said resultant signal to provide a second sliced signal as said output data signal comprises adaptively slicing said resultant signal.

98. The method of claim 97, wherein said adaptively equalizing said input data signal to provide a first equalized signal comprises linearly equalizing said input data signal.

99. The method of claim 97, wherein said adaptively equalizing said input data signal to provide a second equalized signal comprises linearly equalizing said input data signal.

100. An apparatus including a compensation circuit for reducing intersymbol interference (ISI) products within a data signal, comprising:
- an input terminal that conveys an input data signal including a first plurality of ISI products and corresponding to a detected data signal received via a signal transmission medium;
- an output terminal that conveys an output data signal including a second plurality of ISI products which is smaller than said first plurality of ISI products;
- first adaptive equalization circuitry, coupled to said input terminal, that adaptively equalizes said input data signal to provide a first equalized signal;
- second adaptive equalization circuitry, coupled to said input terminal, that adaptively equalizes said input data signal to provide a second equalized signal;
- first signal combining circuitry, coupled to said second adaptive equalization circuitry, that receives and selectively combines a feedback signal and said second equalized signal to provide an intermediate signal;
- first signal slicing circuitry, coupled to said first signal combining circuitry, that slices said intermediate signal to provide a first sliced signal;
- first intermediate processing circuitry, coupled to said first signal slicing circuitry and said first signal combining circuitry, that processes at least one of said first sliced signal and at least a portion of said output data signal to provide said feedback signal;
- second intermediate processing circuitry, coupled between said first signal slicing circuitry and said output terminal, that processes said first sliced signal and another portion of said output data signal to provide a first processed signal;
- second signal combining circuitry, coupled to said first adaptive equalization circuitry and said second adaptive equalization circuitry, that receives and selectively combines said first processed signal and said first equalized signal to provide a resultant signal; and
- output processing circuitry, coupled between said second signal combining circuitry and said output terminal, that processes said resultant signal to provide said output data signal.

101. The apparatus of claim 100, wherein said first adaptive equalization circuitry comprises linear equalization circuitry.

102. The apparatus of claim 100, wherein said second adaptive equalization circuitry comprises linear equalization circuitry.

103. The apparatus of claim 100, wherein said first intermediate processing circuitry comprises decision feedback equalization circuitry.

104. The apparatus of claim 100, wherein said output processing circuitry comprises second signal slicing circuitry, coupled between said second signal combining circuitry and said output terminal, that slices said resultant signal to provide a second sliced signal as said output data signal.

105. The apparatus of claim 104, wherein said second signal slicing circuitry comprises adaptive signal slicing circuitry.

106. The apparatus of claim 105, wherein said first adaptive equalization circuitry comprises linear equalization circuitry.

107. The apparatus of claim 105, wherein said second adaptive equalization circuitry comprises linear equalization circuitry.

108. The apparatus of claim 105, wherein said first intermediate processing circuitry comprises decision feedback equalization circuitry.

109. An apparatus including a compensation circuit for reducing intersymbol interference (ISI) products within a data signal, comprising:
    input means for conveying an input data signal including a first plurality of ISI products and corresponding to a detected data signal received via a signal transmission medium;
    output means for conveying an output data signal including a second plurality of ISI products which is smaller than said first plurality of ISI products;
    first adaptive equalizer means for adaptively equalizing said input data signal to provide a first equalized signal;
    second adaptive equalizer means for adaptively equalizing said input data signal to provide a second equalized signal;
    first signal combiner means for receiving and selectively combining a feedback signal and said second equalized signal to provide an intermediate signal;
    first signal slicer means for slicing said intermediate signal to provide a first sliced signal;
    first intermediate processor means for processing at least one of said first sliced signal and at least a portion of said output data signal to provide said feedback signal;
    second intermediate processor means for processing said first sliced signal and another portion of said output data signal to provide a processed signal;
    second signal combiner means for receiving and selectively combining said processed signal and said first equalized signal to provide a resultant signal; and
    output processor means for processing said resultant signal to provide said output data signal.

110. The apparatus of claim 109, wherein said output processor means comprises second signal slicer means for slicing said resultant signal to provide a second sliced signal as said output data signal.

111. A method for reducing intersymbol interference (ISI) products within a data signal, comprising:
    receiving an input data signal that includes a first plurality of ISI products and corresponds to a detected data signal received via a signal transmission medium;
    adaptively equalizing said input data signal to provide a first equalized signal;
    adaptively equalizing said input data signal to provide a second equalized signal;
    selectively combining a feedback signal and said second equalized signal to provide an intermediate signal;
    slicing said intermediate signal to provide a first sliced signal;
    processing at least one of said first sliced signal and at least a portion of said output data signal to provide said feedback signal;
    processing said first sliced signal and another portion of said output data signal to provide a processed signal;
    selectively combining said processed signal and said first equalized signal to provide a resultant signal; and
    processing said resultant signal to provide an output data signal that includes a second plurality of ISI products which is smaller than said first plurality of ISI products.

112. The method of claim 111, wherein said adaptively equalizing said input data signal to provide a first equalized signal comprises linearly equalizing said input data signal.

113. The method of claim 111, wherein said adaptively equalizing said input data signal to provide a second equalized signal comprises linearly equalizing said input data signal.

114. The method of claim 111, wherein said processing said resultant signal to provide an output data signal that includes a second plurality of ISI products which is smaller than said first plurality of ISI products comprises slicing said resultant signal to provide a second sliced signal as said output data signal.

115. The method of claim 114, wherein said slicing said resultant signal to provide a second sliced signal as said output data signal comprises adaptively slicing said resultant signal.

116. The method of claim 115, wherein said adaptively equalizing said input data signal to provide a first equalized signal comprises linearly equalizing said input data signal.

117. The method of claim 115, wherein said adaptively equalizing said input data signal to provide a second equalized signal comprises linearly equalizing said input data signal.

118. An apparatus including a compensation circuit for reducing intersymbol interference (ISI) products within a data signal, comprising:
    an input terminal that conveys an input data signal including a first plurality of ISI products and corresponding to a detected data signal received via a signal transmission medium;
    an output terminal that conveys an output data signal including a second plurality of ISI products which is smaller than said first plurality of ISI products;
    adaptive equalization circuitry, coupled to said input terminal, that adaptively equalizes said input data signal to provide first and second equalized signals;
    signal slicing circuitry, coupled to said adaptive equalization circuitry, that selectively slices said first equalized signal to provide a sliced signal;
    intermediate processing circuitry, coupled to said signal slicing circuitry, that processes said sliced signal to provide at least one processed signal; and
    output processing circuitry, coupled between said adaptive equalization circuitry, said intermediate processing circuitry and said output terminal, that selectively processes said second equalized signal and said at least one processed signal to provide said output data signal;

wherein
said signal slicing circuitry further provides a first adaptation control signal,
said output processing circuitry further provides a second adaptation control signal,
said adaptive equalization circuitry receives said first and second adaptation control signals and in response thereto adaptively equalizes said input data signal to provide said first and second equalized signals, and
said intermediate processing circuitry receives said second adaptation control signal and in response thereto adaptively processes said sliced signal to provide said at least one processed signal.

119. An apparatus including a compensation circuit for reducing intersymbol interference (ISI) products within a data signal, comprising:
input means for conveying an input data signal including a first plurality of ISI products and corresponding to a detected data signal received via a signal transmission medium;
output means for conveying an output data signal including a second plurality of ISI products which is smaller than said first plurality of ISI products;
adaptive equalizer means for adaptively equalizing said input data signal and providing first and second equalized signals;
signal slicer means for selectively slicing said first equalized signal and providing a sliced signal;
intermediate processor means for processing said sliced signal and providing at least one processed signal; and
output processor means for selectively processing said second equalized signal and said at least one processed signal and providing said output data signal;
wherein
said signal slicer means is further for providing a first adaptation control signal,
said output processor means is further for providing a second adaptation control signal,
said adaptive equalizer means is for receiving said first and second adaptation control signals and in response thereto adaptively equalizing said input data signal to provide said first and second equalized signals, and
said intermediate processor means is for receiving said second adaptation control signal and in response thereto adaptively processing said sliced signal to provide said at least one processed signal.

120. A method for reducing intersymbol interference (ISI) products within a data signal, comprising:
receiving an input data signal including a first plurality of ISI products and corresponding to a detected data signal received via a signal transmission medium;
adaptively equalizing said input data signal and providing first and second equalized signals;
selectively slicing said first equalized signal and providing a sliced signal;
processing said sliced signal and providing at least one processed signal; and
selectively processing said second equalized signal and said at least one processed signal and providing an output data signal including a second plurality of ISI products which is smaller than said first plurality of ISI products;
wherein
said selectively slicing said first equalized signal to provide a sliced signal comprises selectively slicing said first equalized signal to provide said sliced signal and a first adaptation control signal,
said selectively processing said second equalized signal and said at least one processed signal to provide an output data signal including a second plurality of ISI products which is smaller than said first plurality of ISI products comprises selectively processing said second equalized signal and said at least one processed signal to provide said output data signal and a second adaptation control signal,
said adaptively equalizing said input data signal to provide first and second equalized signals comprises receiving said first and second adaptation control signals and in response thereto adaptively equalizing said input data signal to provide said first and second equalized signals, and
said processing said sliced signal to provide at least one processed signal comprises receiving said second adaptation control signal and in response thereto adaptively processing said sliced signal to provide said at least one processed signal.

* * * * *